US008268047B2

(12) United States Patent
Allie

(10) Patent No.: US 8,268,047 B2
(45) Date of Patent: Sep. 18, 2012

(54) METHODS AND SYSTEMS FOR HELIUM RECOVERY

(75) Inventor: Mohamed Safdar Allie, Wheatfield, NY (US)

(73) Assignee: Praxair Technology, Inc., Danbury, CT (US)

( * ) Notice: Subject to any disclaimer, the term of this patent is extended or adjusted under 35 U.S.C. 154(b) by 378 days.

(21) Appl. No.: 12/769,196

(22) Filed: Apr. 28, 2010

(65) Prior Publication Data
US 2010/0251892 A1    Oct. 7, 2010

Related U.S. Application Data

(62) Division of application No. 12/163,461, filed on Jun. 27, 2008, now Pat. No. 7,780,764.

(51) Int. Cl.
B01D 53/047 (2006.01)
B01D 53/053 (2006.01)
(52) U.S. Cl. .................. 95/117; 95/136; 95/143
(58) Field of Classification Search ........... 95/96, 116, 95/117, 121, 136, 143; 96/108, 121, 130, 96/131, 132
See application file for complete search history.

(56) References Cited

U.S. PATENT DOCUMENTS

| 3,944,400 | A | | 3/1976 | Bird | |
|---|---|---|---|---|---|
| 4,233,038 | A | * | 11/1980 | Tao | 95/104 |
| 4,369,048 | A | | 1/1983 | Pence | |
| 4,698,217 | A | * | 10/1987 | Valyocsik | 423/706 |
| 4,859,217 | A | * | 8/1989 | Chao | 95/130 |
| 5,080,694 | A | * | 1/1992 | Knoblauch et al. | 95/26 |
| 5,089,048 | A | * | 2/1992 | Knoblauch et al. | 95/103 |
| 5,174,979 | A | * | 12/1992 | Chao et al. | 95/96 |
| 5,224,350 | A | * | 7/1993 | Mehra | 62/624 |
| 5,413,625 | A | * | 5/1995 | Chao et al. | 95/103 |
| 5,429,664 | A | * | 7/1995 | Lee | 95/54 |
| 5,454,857 | A | * | 10/1995 | Chao | 95/96 |
| 5,542,966 | A | * | 8/1996 | D'Amico et al. | 95/101 |
| 5,614,000 | A | * | 3/1997 | Kalbassi et al. | 95/96 |
| 5,632,803 | A | * | 5/1997 | Stoner et al. | 95/53 |
| 5,674,311 | A | * | 10/1997 | Notaro et al. | 95/96 |
| 5,698,013 | A | * | 12/1997 | Chao | 96/108 |

(Continued)

FOREIGN PATENT DOCUMENTS

WO    WO 99/48604    9/1999

OTHER PUBLICATIONS

Calis, H.P.A. et al., "CFD modelling and experimental validation of pressure drop and flow profile in a novel structured catalytic reactor packing", Chemical Engineering Science 56 (2001) 1713-1720.

(Continued)

*Primary Examiner* — Frank Lawrence, Jr.
(74) *Attorney, Agent, or Firm* — Salvatore P. Pace

(57) ABSTRACT

The present invention relates generally to processes and systems for recovering helium from low helium-containing feed gases (i.e., containing less than about 10 volume % helium and more typically, less than about 5% helium by volume). The present invention more particularly relates to processes and systems for recovering helium from low helium-containing feed gases using temperature swing adsorption (TSA) systems and multiple (e.g. two) stage vacuum pressure swing adsorption (VPSA) systems. In preferred embodiments of the invention, the first stage VPSA system is configured to provide regeneration gas for the TSA system, and/or the VPSA second stage tail gas is recycled to the first stage VPSA system.

22 Claims, 12 Drawing Sheets

Helium Recovery Process

U.S. PATENT DOCUMENTS

| | | | |
|---|---|---|---|
| 5,707,425 A * | 1/1998 | D'Amico et al. | 95/101 |
| 5,787,730 A | 8/1998 | Heim et al. | |
| 5,914,455 A | 6/1999 | Jain et al. | |
| 6,010,555 A | 1/2000 | Smolarek et al. | |
| 6,179,900 B1 * | 1/2001 | Behling et al. | 95/45 |
| 6,284,705 B1 | 9/2001 | Park et al. | |
| 6,500,235 B2 | 12/2002 | Zhong et al. | |
| 6,503,299 B2 * | 1/2003 | Baksh et al. | 95/98 |
| 6,521,019 B2 | 2/2003 | Jain et al. | |
| 6,630,011 B1 * | 10/2003 | Baker et al. | 95/47 |
| 6,692,626 B2 | 2/2004 | Keefer et al. | |
| 7,032,894 B2 | 4/2006 | Adusei et al. | |
| 7,169,210 B2 * | 1/2007 | Baksh et al. | 95/11 |
| 7,179,324 B2 * | 2/2007 | Baksh et al. | 95/100 |
| 7,191,805 B2 * | 3/2007 | Cohen et al. | 141/4 |
| 2002/0178913 A1 | 12/2002 | Ji et al. | |
| 2005/0217481 A1 | 10/2005 | Dunne et al. | |
| 2008/0148936 A1 * | 6/2008 | Baksh | 95/47 |

OTHER PUBLICATIONS

Romkes, S.J.P. et al., "CFD modeling and experimental validation of particle-to-fluid mass and heat transfer in a packed bed at very low channel to particle diameter ratio", Chemical Engineering Journal 96 (2003) 3-13.

Janssen, L.P.B.M. et al., "Transport Phenomena Data Companion", Hydraulic Diameters, Delftse Uitgevers Maatschappij B.V., Delft, The Netherlands, p. 86 (1987).

Tavoularis, Stavros, "Fluid Mechanics", Kirk-Othmer Encyclopedia of Chemical Technology, vol. 11, p. 751 and p. 766, Dec. 17, 2004.

Perry, R.H. et al., "Perry's Chemical Engineers' Handbook, Sixth Edition", Jan. 1, 1985, McGraw-Hill Book Company, pp. 5-6, right-hand col. pp. 5-25.

\* cited by examiner

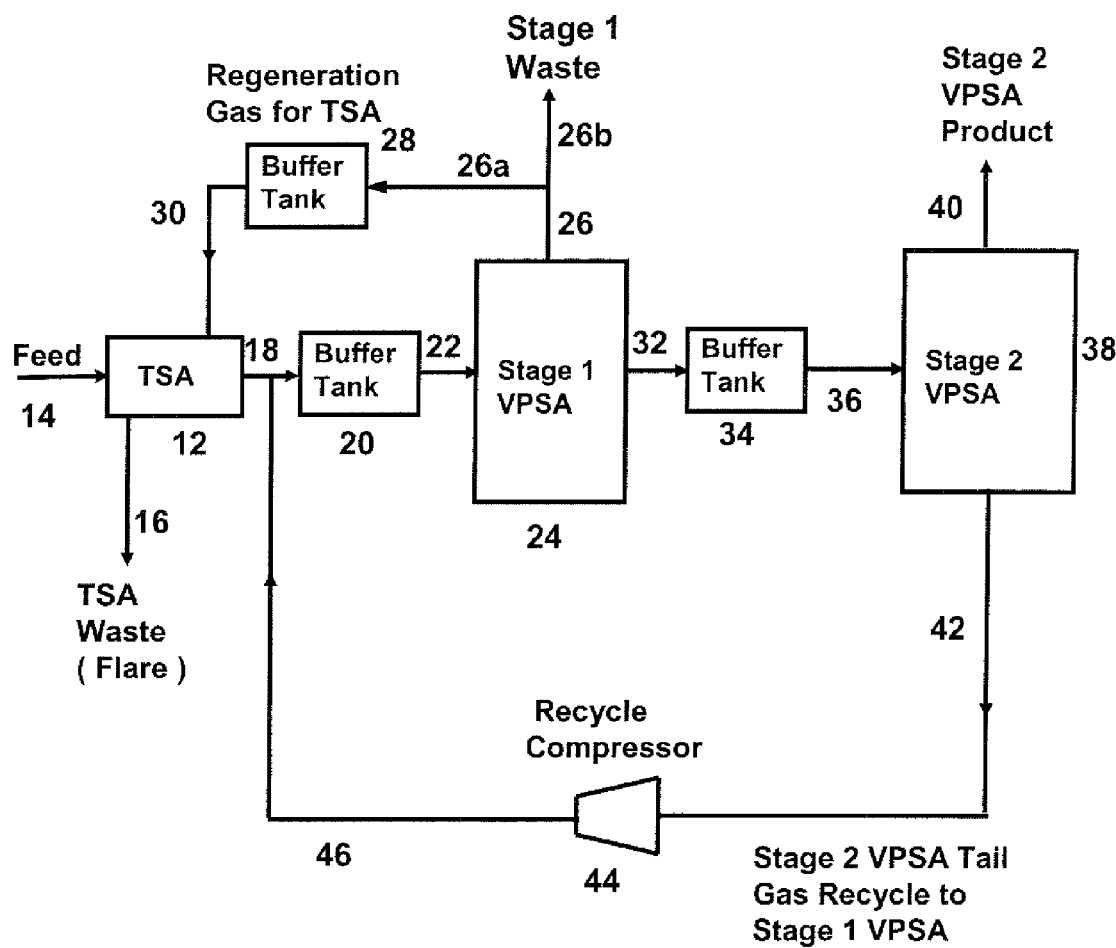
Figure 1: Helium Recovery Process

Figure 2: Temperature Swing Adsorption (TSA) Bed Configuration
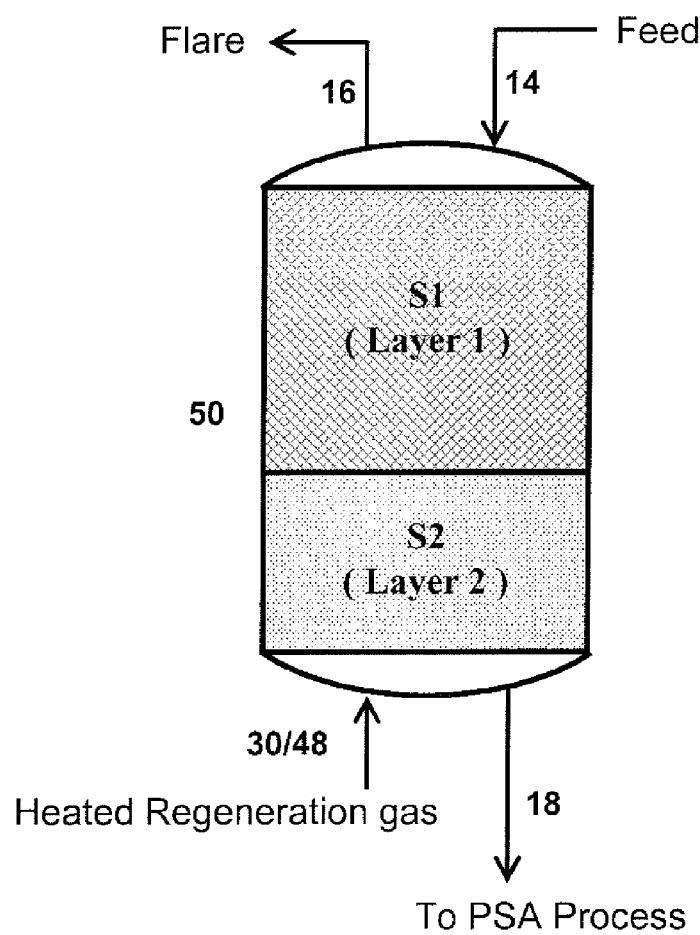

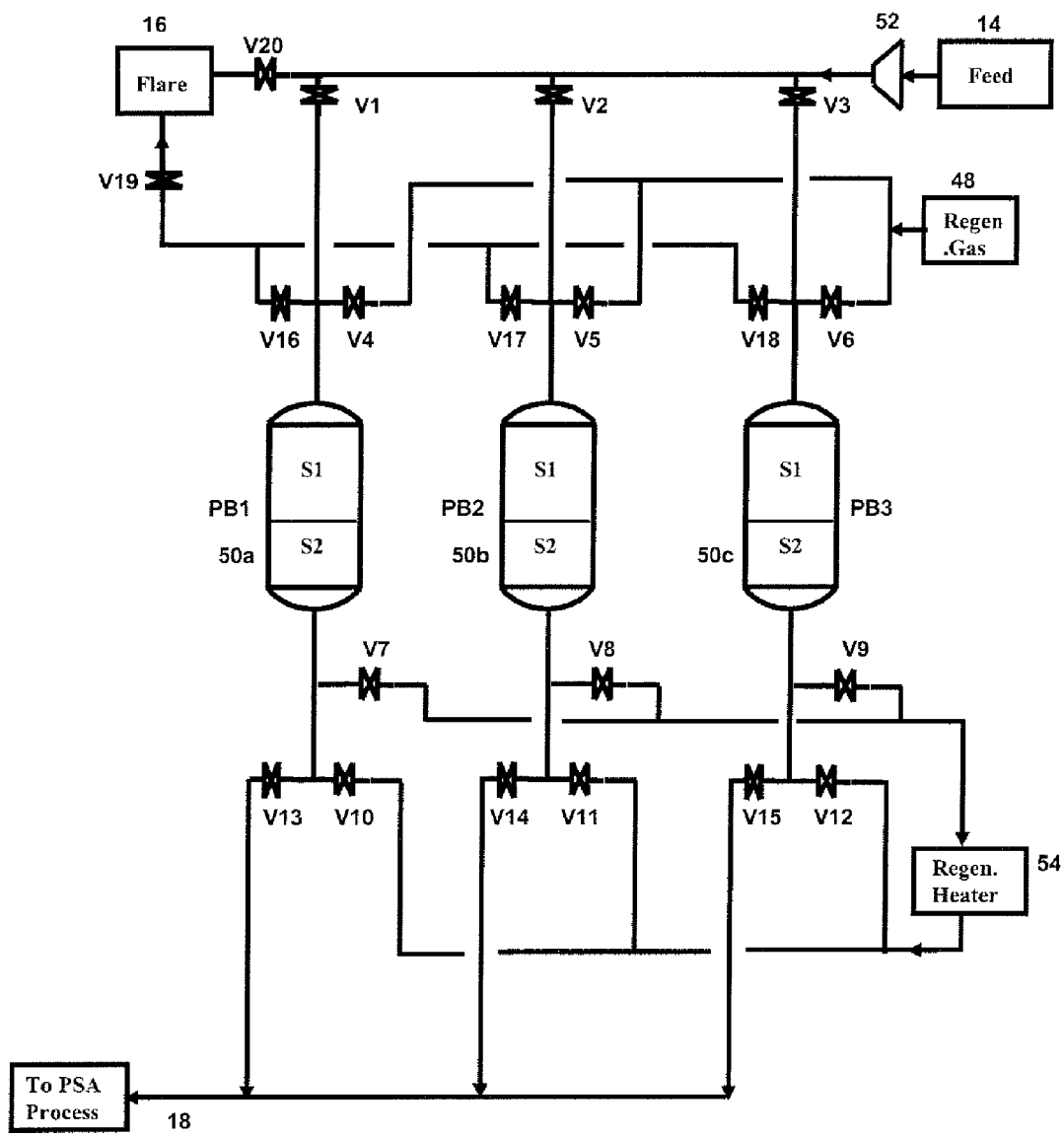
Figure 3: Three Bed Temperature Swing Adsorption System

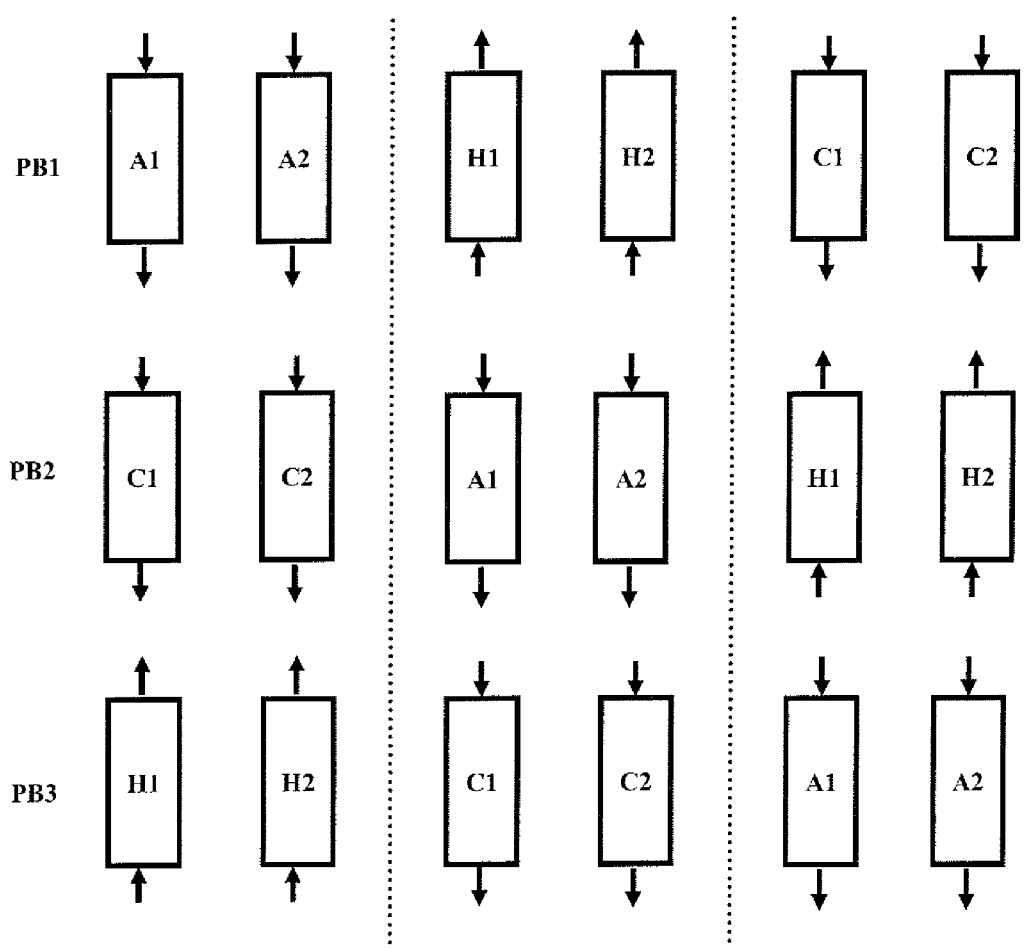
Figure 4: Three Bed Temperature Swing Adsorption Cycle

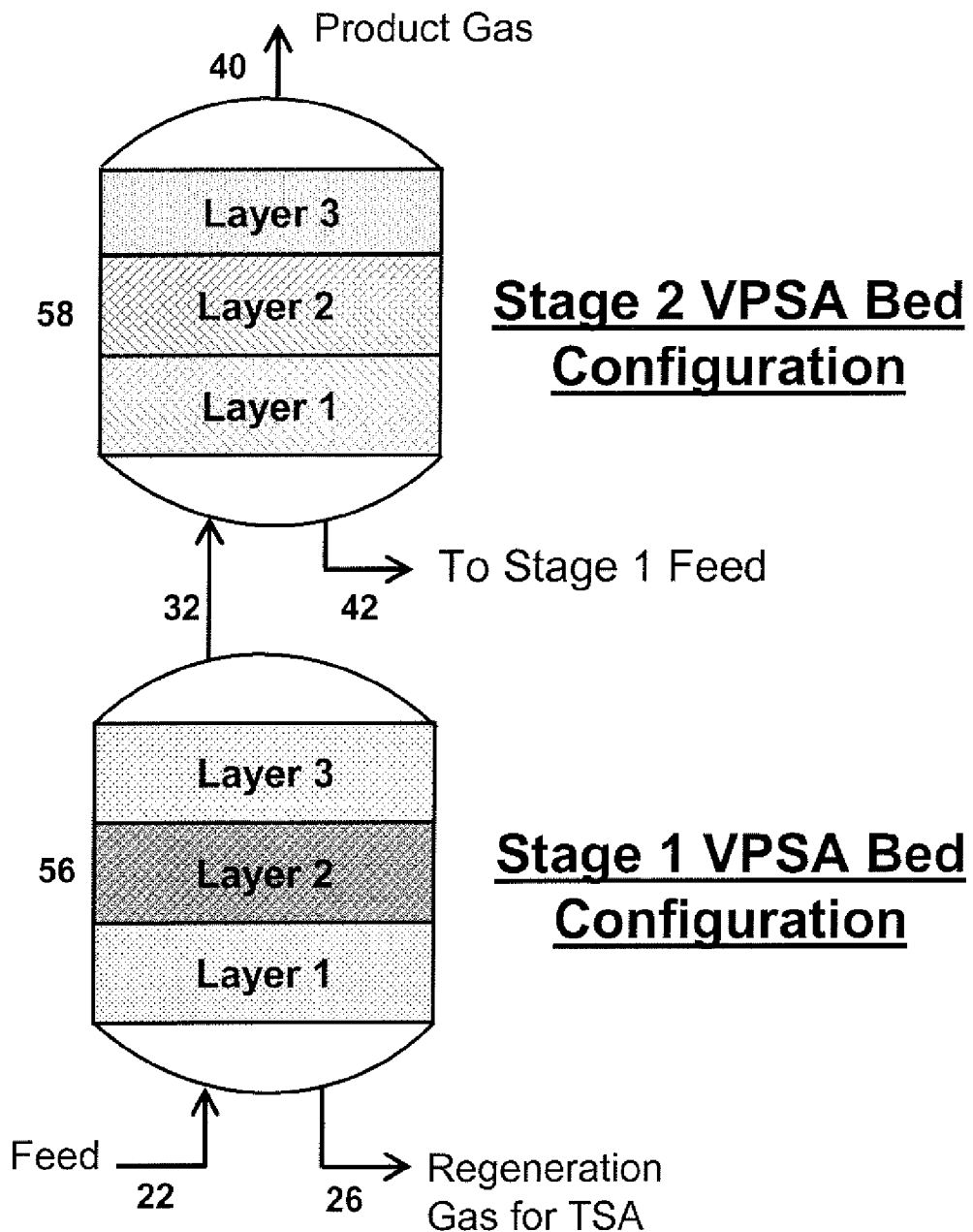
Figure 5: Two Stage PSA Bed Arrangement Depicting Layers of Adsorbents Used in First and Second Stage PSA Systems

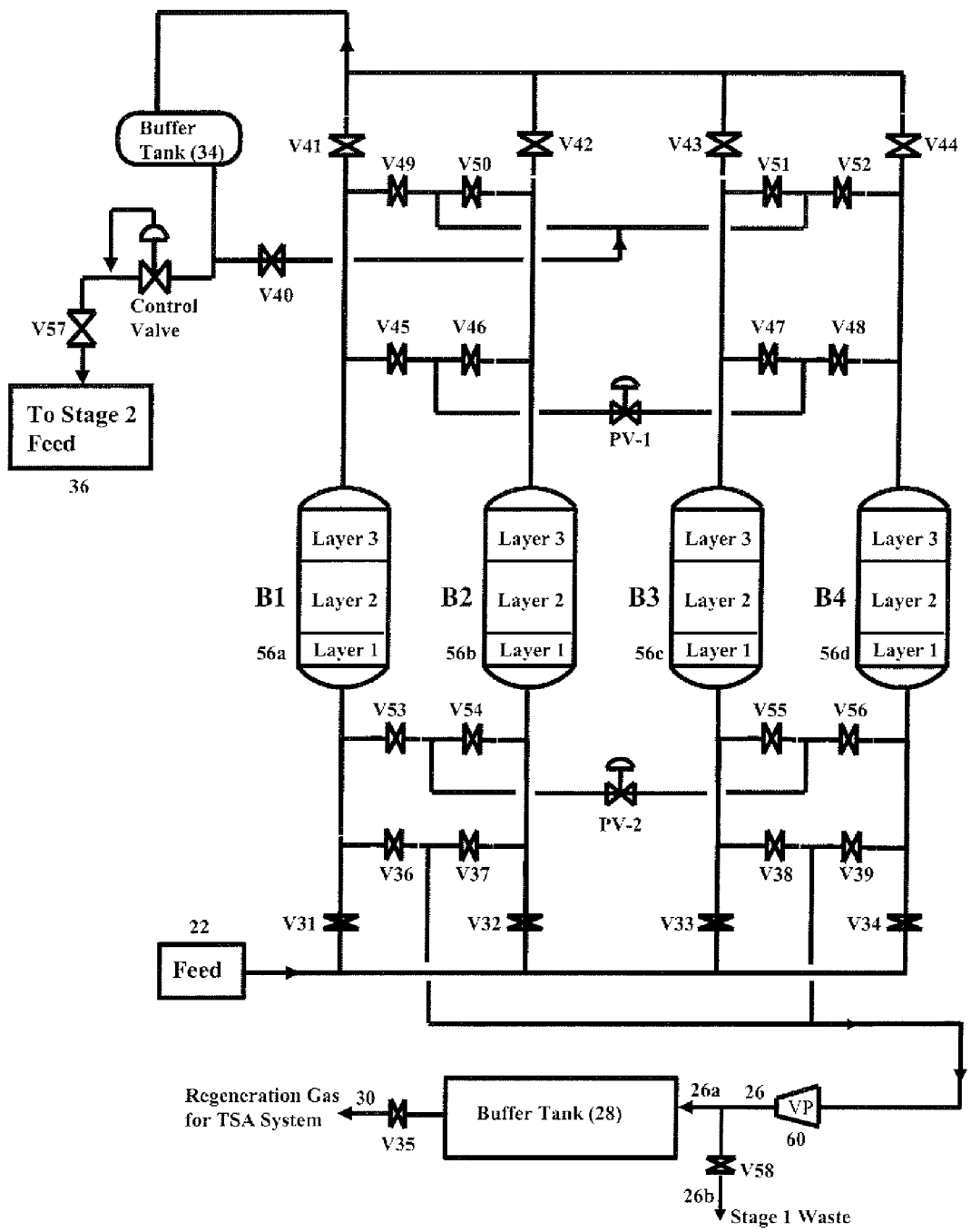
Figure 6: First Stage (Stage 1) VPSA System with three layers of adsorbents (e.g., alumina, activated carbon and zeolite) in each bed

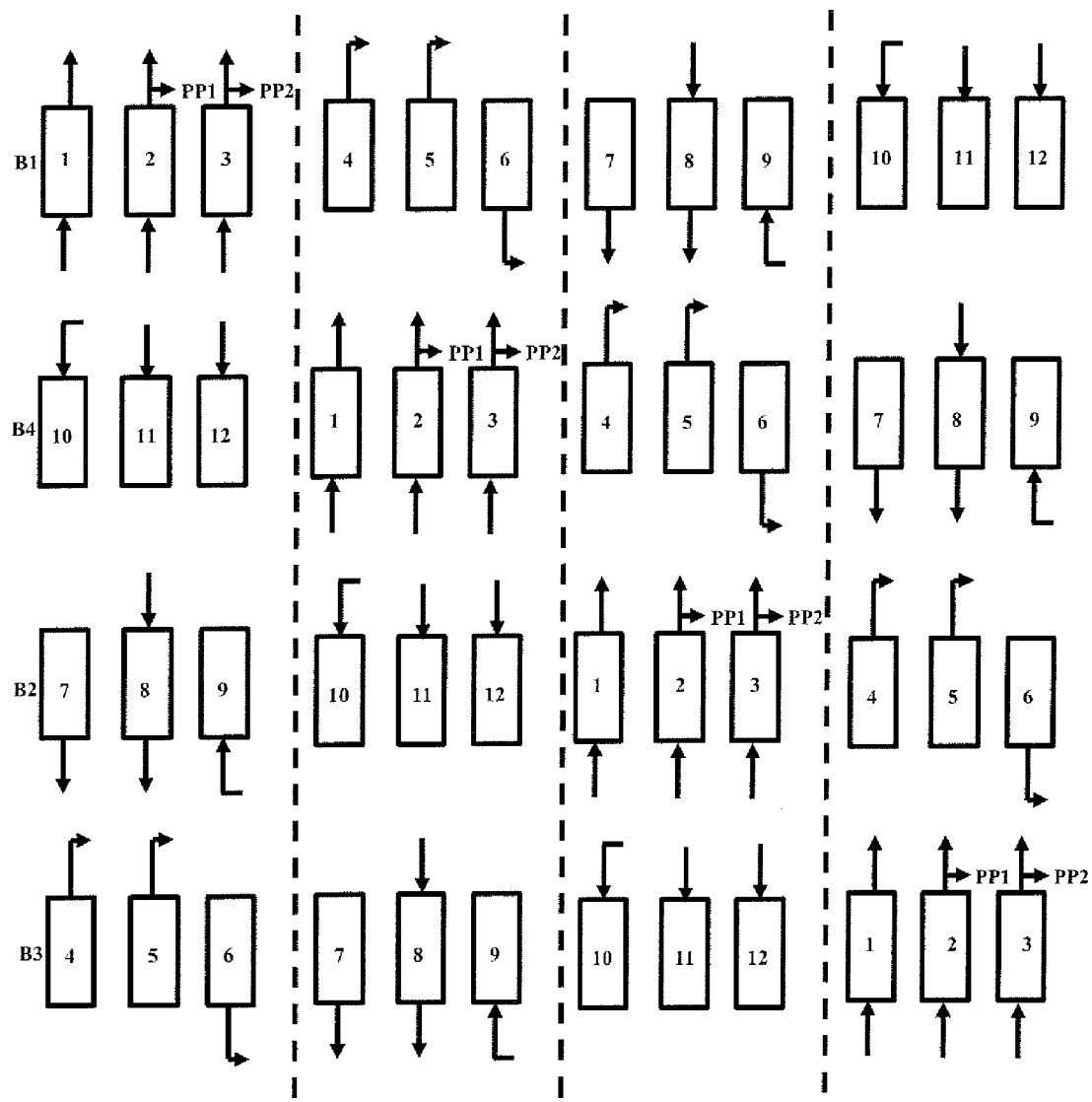
Figure 7: First Stage (Stage 1) VPSA Cycle Using Four Beds

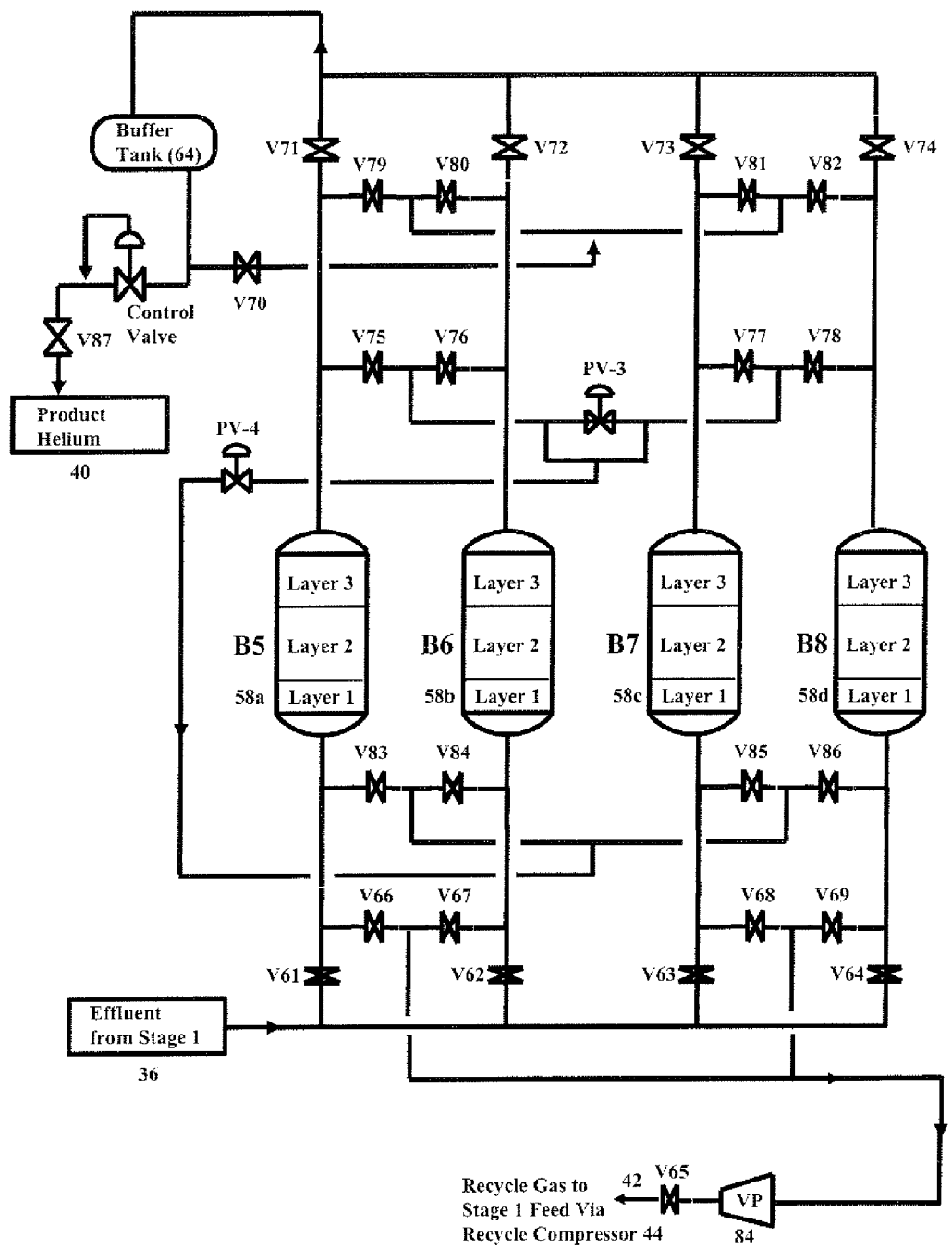
Figure 8: Second Stage (Stage 2) VPSA System with three layers of adsorbents (e.g., alumina, activated carbon and zeolite) in each bed

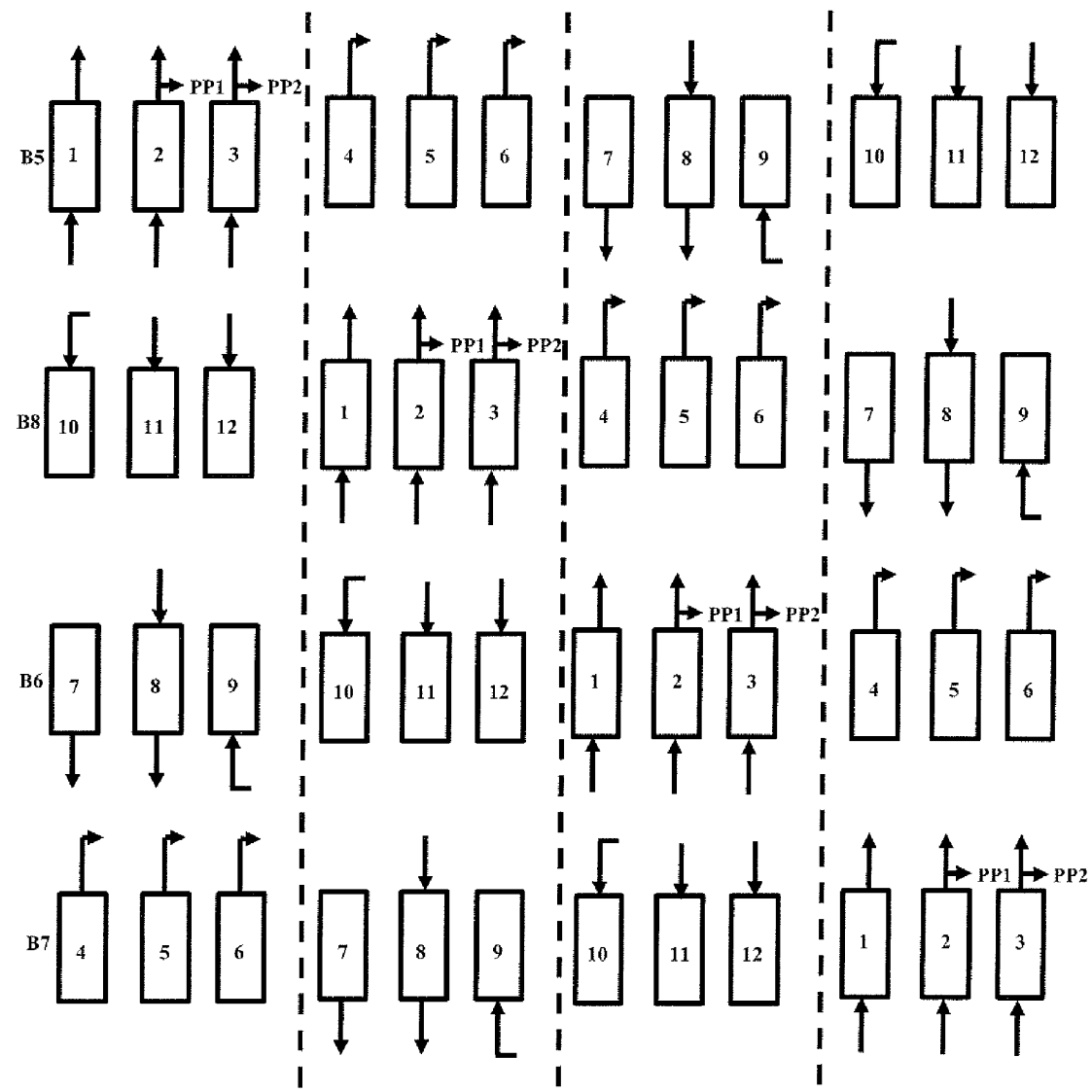
Figure 9: Second Stage (Stage 2) VPSA Cycle Using Four Beds

Figure 10: Helium Recovery Process Performance Using Layered Bed of Adsorbents and Improved VPSA Cycles Versus Prior Art Helium System
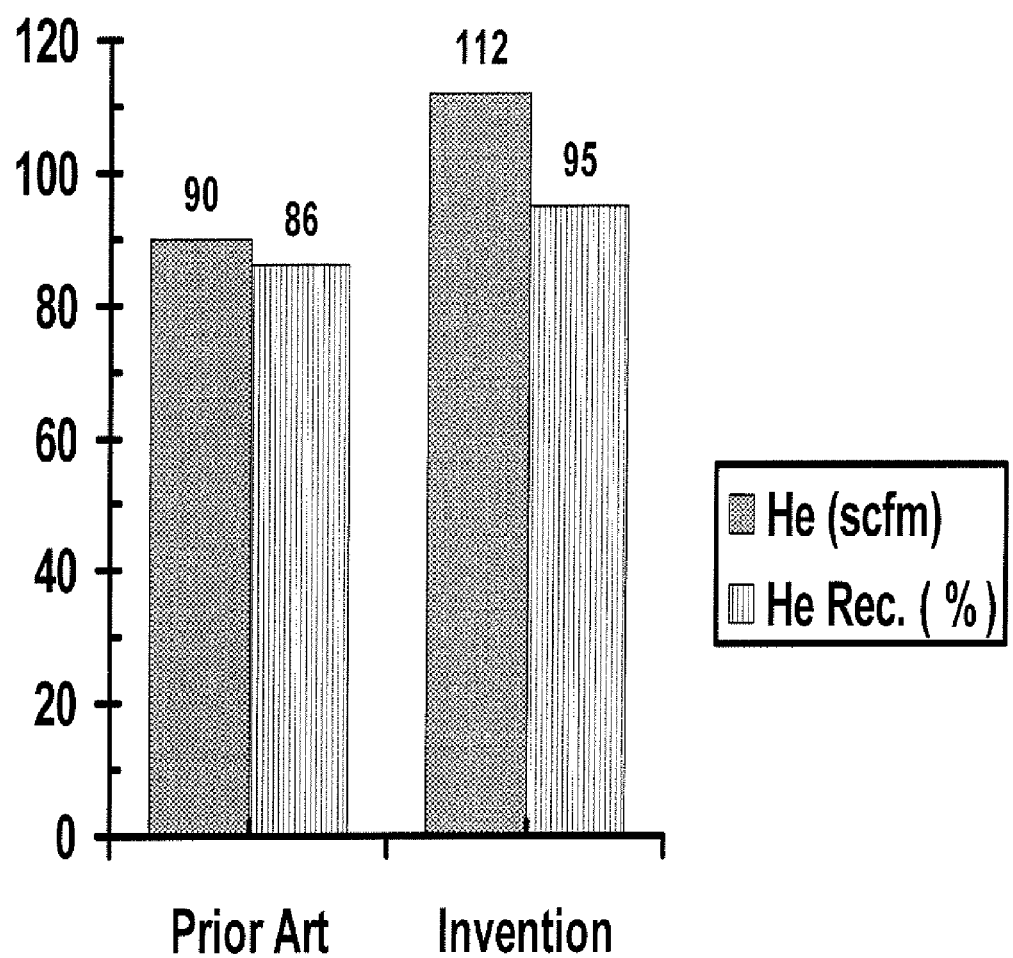

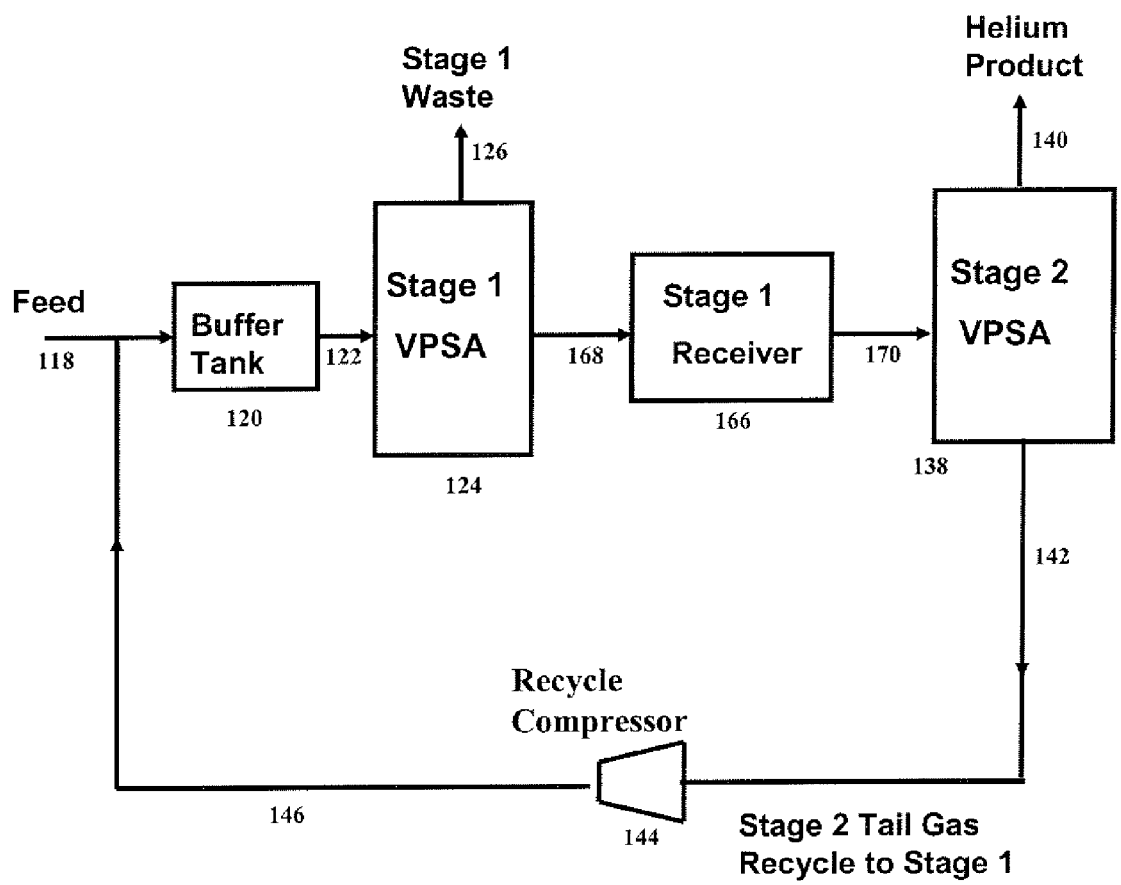
Figure 11: Alternative Embodiment Using a Two-Stage VPSA Helium Recovery System

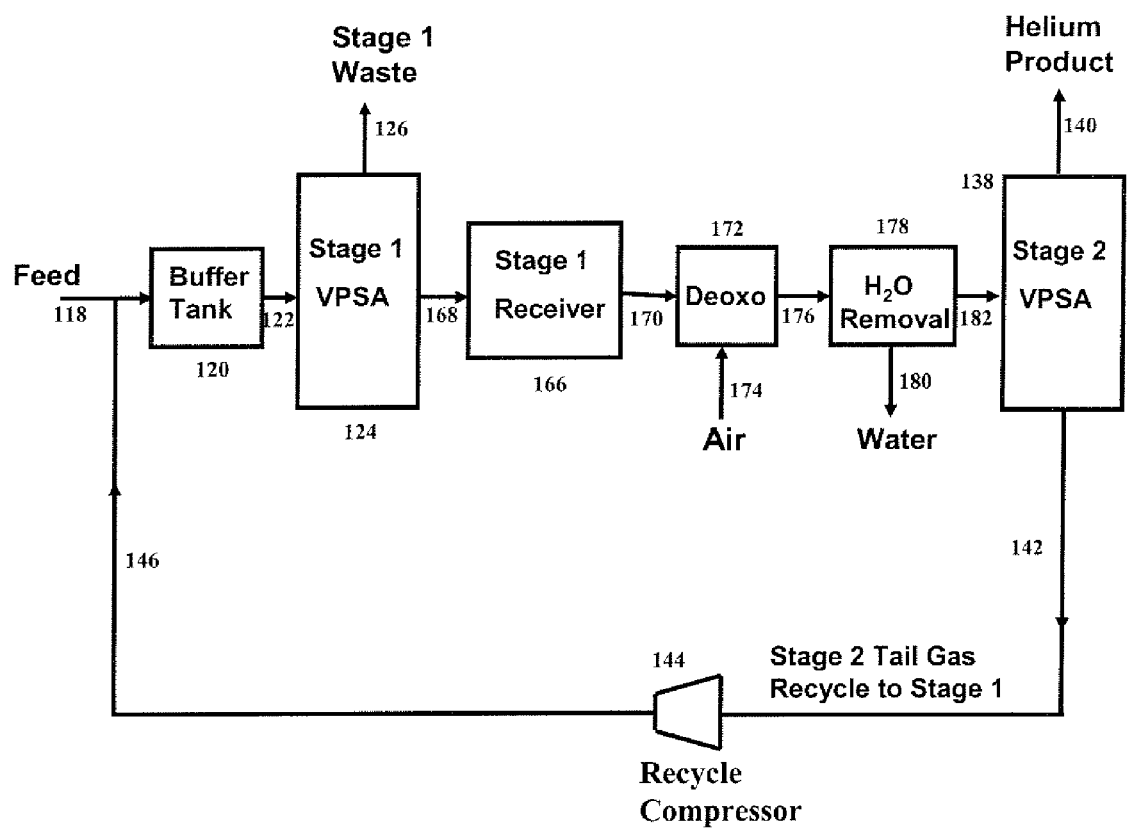
Figure 12: Alternative Embodiment of Two-Stage Helium Recovery System ( Feed Gas Contains $H_2$ )

METHODS AND SYSTEMS FOR HELIUM RECOVERY

CROSS-REFERENCE TO RELATED APPLICATION

The present invention is a division of, and claims the benefit of U.S. patent application Ser. No. 12/163,461, filed Jun. 27, 2008 and now U.S. Pat. No. 7,780,764, which is incorporated by reference herein in its entirety.

FIELD OF THE INVENTION

The present invention relates generally to processes and systems for recovering helium from low helium-containing feed gases (i.e., containing less than about 10 volume % helium and more typically, less than about 5% helium by volume). The present invention more particularly relates to processes and systems for recovering helium from low helium-containing feed gases using temperature swing adsorption (TSA) systems and multiple (e.g. two) stage vacuum pressure swing adsorption (VPSA) systems. In preferred embodiments of the invention, the first stage VPSA system is configured to provide regeneration gas for the TSA system, and/or the VPSA second stage tail gas is recycled to the first stage VPSA system.

BACKGROUND OF THE INVENTION

Helium is mainly produced by the radioactive decay of heavier elements such as uranium and thorium. The helium formed upon radioactive decay typically percolates slowly through rock into large cavities that also contain reserves of natural gas. Helium diffusion from these pockets results in relatively low atmospheric concentration (e.g., 5 ppmv). Once released from the soil or water, it is irreversibly lost in space. Consequently, helium is considered a nonrenewable resource.

In the past, pressure swing adsorption systems have been used to separate or remove helium from helium-containing feed gases. Such pressure swing adsorption (PSA) or vacuum pressure swing adsorption (VPSA) systems have had low helium purity and per pass helium recovery when using a single stage PSA or VPSA process alone to recover helium. Prior art efforts to achieve enhanced helium purity and recovery have included utilizing a combination of PSA systems and membranes, or PSA and cryogenic systems, or serial arrangements of PSA or VPSA processes. In some prior art two stage VPSA systems, the same or different number of beds are used in the stages with PSA or VPSA cycles utilizing rinse steps and additional compression equipment(s). Such systems and processes can result in higher capital and/or operating costs.

Helium-containing feed gas can contain several components, e.g. a feed stream may contain large concentrations of $N_2$ and trace quantities of hydrocarbons and/or other contaminants. Prior art systems that use primarily all carbon beds to remove the contaminants in the helium-containing feed gas result in an inefficient, uneconomical or unsustainable helium recovery system due to the degradation of carbon adsorbent and excessive use of compression equipment that are necessary for various steps in the helium recovery process. Given that the helium-containing feed gas composition can vary widely, significant challenges have existed to determine efficient adsorbent selection for a combination of adsorbates, adsorbent configuration in the adsorber, and purity control to achieve an efficient He recovery from PSA/VPSA processes.

U.S. Pat. Nos. 5,089,048 and 5,080,694 to Knoblauch et al. disclose PSA processes for extracting helium from a relatively helium poor gas mixture, e.g., natural gas containing 2-10% helium by volume.

U.S. Pat. No. 5,542,966 to D'Amico et al. relates to pressure swing adsorption processes to recover helium from source streams of less than about 10 percent by volume helium and concentrate the helium to a concentration of greater than about 98 percent by volume. Two stages of pressure swing adsorption are used in series. The source of the helium gas can be natural gas wells. The source gas can contain hydrocarbons, although in many instances, the primary gas other than helium will be nitrogen.

U.S. Pat. No. 5,707,425 D'Amico et al. is directed to the recovery of helium gas from gas streams containing about 25% by volume or more of helium. Two PSA processes are used in a serial arrangement.

U.S. Pat. No. 5,632,803 to Stoner et al. relates to a hybrid membrane/PSA process for producing helium product streams at purities in excess of 98% from feed stock containing from 0.5 to 5.0% helium. The membrane is placed upstream of two PSA processes, and all of the separation units are arranged in a serial configuration. According to this invention, the hybrid system utilizes at least one stage of membrane enrichment followed by at least two stages of pressure swing adsorption.

U.S. Pat. No. 5,224,350 to Mehra relates to a system of taking a subquality nitrogen-rich natural gas stream containing more than 0.1 mol % helium to produce a rich solvent bottoms stream that is flashed twice to produce a methane-rich gas product and a nitrogen-helium product which is fed to at least one membrane unit. A reject nitrogen stream and a crude helium stream are discharged from this unit. The crude helium stream is either compressed to a pressure within the range of 200 to 3,000 psia or is compressed to no more than 1,000 psia and fed to a PSA unit which produces a reject nitrogen stream and a purified helium stream which is compressed to a pressure within the range of 200 to 3,000 psia.

U.S. Pat. No. 6,630,011 B1 to Baker al. relates to a process for treating natural gas or other methane-rich gas to remove excess nitrogen. The process relies on two-stage membrane separation, using methane-selective membranes for the first stage and nitrogen-selective membranes for the second stage.

U.S. Pat. No. 6,179,900 B1 to Behling et al. describes processes for the separation/recovery of gases where the desired component to be separated from the mixture is present in low molar concentrations and/or low to moderate pressures. A combined membrane/PSA process is utilized for the separation/recovery of gaseous components which are present in the stream at low pressures and/or molar contents. The membrane unit is positioned at the upstream end of the PSA process.

U.S. Pat. No. 7,294,172 B2 to Baksh et al. discloses a highly efficient and low cost noble gas recovery system to recover and conserve valuable gas (e.g., helium) from various applications (e.g., atomization furnaces, plasma furnaces, sputtering, etc.). In addition, U.S. Pat. No. 7,169,210 B2 to Baksh et al. relates to a control system for a helium recovery system.

There remains a need for improved methods and systems for helium recovery from low helium-containing feed gases (i.e. containing less than about 10% helium by volume and more typically, less than about 5% helium by volume) at high (e.g., >90%) helium recoveries, high throughput, and improved capital and operating costs.

BRIEF SUMMARY OF THE INVENTION

As mentioned above, the present invention relates generally to processes and systems for recovering helium from low helium-containing feed gases (i.e., containing less than about 10 volume % helium and more typically, less than about 5% helium by volume). The present invention more particularly relates to processes and systems for recovering helium from low helium-containing feed gases using temperature swing adsorption (TSA) systems and multiple (e.g. two) stage vacuum pressure swing adsorption (VPSA) systems. Each stage of the VPSA systems contains multiple (e.g. four) beds, with each bed containing at least one layer of adsorbent that can selectively adsorb at least one component in the feed stream. In accordance with the methods of the present invention, the stages of the VPSA systems are provided with distinct cycles. In certain embodiments, a temperature swing adsorption (TSA) system is positioned upstream of the multiple stage VPSA systems for pretreatment of the feed gases. In preferred embodiments of the invention, the first stage VPSA system provides regeneration gas for the TSA system, and/or the VPSA second stage tail gas is recycled to the first stage VPSA system.

Exemplary low helium-containing feed gases suitable for treatment in accordance with the present invention include, but are not limited to natural gas streams and natural gas streams in which much or all of the methane has been removed. An exemplary low helium-containing feed gas suitable for treatment in accordance with the present invention can contain helium and one or more of: nitrogen, carbon dioxide, methane, water, ethane, propane, i-butane, n-butane, i-pentane, n-pentane and/or hydrocarbons having equal to or greater than 6 carbon atoms (e.g., hexane, benzene, toluene, xylene). Such feed gases may also include other components such as: $NO_x$, $SO_x$, $NH_3$, $H_2$, $H_2S$ and the like.

According to certain embodiments of the present invention, a temperature swing adsorption (TSA) system for pretreatment of the feed gases can be included upstream of multiple stage PSA or VPSA systems. Depending on the contaminants present in the helium-containing feed gas, the pressure swing adsorption processes could utilize super atmospheric operating pressures only, i.e., as in PSA systems, or trans atmospheric operating pressures (above and below ambient pressures), i.e., as in VPSA systems. If adsorbates (e.g., $C_3^+$ hydrocarbons) are difficult to remove from the adsorbent(s) for example, it may be preferred or necessary to use VPSA system(s) rather than PSA system(s). In preferred embodiments of the invention, the PSA or VPSA first stage provides regeneration gas for the TSA system, and/or at least a portion of the PSA or VPSA second stage tail gas is recycled to the PSA or VPSA first stage. It is expected that methods and systems in accordance with the present invention will be able to achieve about 10% higher helium recovery and about 24% more helium throughput or productivity over some prior art systems.

In accordance with some embodiments of the invention, a temperature swing adsorption (TSA) and two vacuum pressure swing adsorption (VPSA) systems are preferably employed when heavy contaminants such as heavy hydrocarbons (e.g., $C_4^+$) and/or $H_2S$ or the like are present in the helium-containing feed gases. The TSA system can be used upstream of the two VPSA systems (configured as a two stage VPSA system) for heavy contaminant removal such as heavy hydrocarbons (e.g., $C_4^+$, BTX (i.e., benzene, toluene and/or xylene), $H_2S$, $NO_x$, $SO_x$, $NH_3$, $H_2S$ and/or $H_2O$ and the like. Removal of such heavy contaminants by the TSA system can suppress degradation of the adsorbents in the downstream two stage VPSA or pressure swing adsorption (PSA) systems and processes. More specifically, the TSA is needed or desirable to suppress degradation of the stage one adsorbents due to irreversible adsorption using typical VPSA desorption pressures if some heavy contaminants (e.g., BTX and heavy hydrocarbons) present in the helium-containing feed gas are treated in the first stage VPSA system (i.e. some such adsorbents are not easily desorbed using typical VPSA desorption pressures). In addition, if $H_2$ is present in the helium-containing feed gas, then a hydrogen removal unit (e.g., conventional deoxo unit) can be added between the first and second stage VPSA systems (see for example, FIG. 12).

In preferred embodiments of the invention, the tail gas or effluent leaving the feed end during bed regeneration of the first stage VPSA system is used as the purging gas for the upstream TSA process. In addition, the tail gas or effluent leaving the feed end during bed regeneration of the second stage VPSA system is recycled to the feed inlet of the first stage VPSA process to achieve improved helium recovery. As described hereinbelow, buffer tank(s) are preferably used in some instances to smooth out flow, pressure and/or composition fluctuations of the effluent stream(s) from one stage going into another stage(s) via the integration of the present invention.

The two stage PSA or VPSA cycles according to the present invention include distinct cycles in stages one and two. The stage one PSA or VPSA cycle utilizes bottom-to-bottom equalization instead of a rinse step that is used in some prior art helium VPSA cycles and the stage two PSA/VPSA cycle utilizes top-to-bottom equalization instead of a rinse step that is used in some prior art helium VPSA cycles.

In addition, the present invention allows for full synchronization among the TSA and two stage VPSA systems to achieve continuous product and feed steps in the helium recovery system. As mentioned above, the tail gas from the stage one VPSA system can be used as the regeneration or purge gas for the upstream TSA system and a buffer tank can be used to smooth out the stage one PSA or VPSA tail gas flows and/or composition prior to sending the tail gas as the purging gas for the TSA system during bed regeneration. The TSA cycle time is preferably an integral multiple (e.g., 15 times) of the stage one VPSA cycle time, and the multiplier depends on the impurities to be removed by the TSA system, and the duration of the TSA heating or cooling time required for specified TSA bed sizes.

The present invention additionally is expected to allow for the tail gas from the stage two PSA or VPSA system to be recycled back to the feed end of the stage one PSA or VPSA system. The PSA or VPSA cycles for the two PSA or VPSA systems are synchronized so that the effluent from stage one goes to the stage two feed (typically via a buffer tank) without any interruption. Similarly, the effluent from the TSA system can be fed continuously (typically via a buffer tank) to the feed end of the first stage PSA system. In addition, all the purge gas for the TSA system is preferably supplied from the tail gas from the stage one PSA system. In accordance with further aspects of the invention, the stage one PSA or VPSA system utilizes bottom-to-bottom bed equalization during the initial re-pressurization of the stage one beds, thereby eliminating the need for rinse steps used in some prior art systems that require compression to the first stage adsorption pressure and the stage two PSA or VPSA system utilizes top-to-bottom bed equalization during the initial re-pressurization of the stage two beds, thereby eliminating the need for rinse steps used in some prior art systems that require compression to the second stage adsorption pressure.

Depending on the type of feed gas and the system and process being used, the present invention can include some or all of the following features. Each bed in the stage one PSA or VPSA system can include three layers of adsorbents, and each bed in stage two can preferably include a weak adsorbent (e.g., activated carbon or 5A zeolite) and a strong adsorbent (e.g., VSA-6 (such as VSA-6 8×12 zeolite from UOP, LLC of Des Plaines, Ill.) zeolite, LiX zeolite, CaX zeolite, or Z10-08 or Z10-08EP zeolites (both Z10-08 or Z10-08EP zeolites by Zeochem LLC) positioned on top of the weak adsorbent. The stage two VPSA system also preferably includes an adsorbent such as alumina positioned upstream of the weak adsorbent (which can provide for adsorption and/or flow distribution). This is in contrast to some prior art systems which have utilized activated carbon beds in each bed of stages one and two of the VPSA systems for helium recovery. High performance and layered beds of adsorbents are used in the TSA and VPSA systems of the present invention to achieve improved helium recoveries and throughputs. In addition, adsorbents selective for heavy contaminants present in the feed gas can be selected and arranged in the TSA system to suppress degradation of the stage one PSA or VPSA system adsorbents. Each stage of the PSA or VPSA system preferably contains four adsorbent beds utilizing different PSA or VPSA cycles with full synchronization between the stages to handle various streams to continuously deliver high purity helium product. In the aforementioned embodiments having layered beds of selected adsorbents in the two stage VPSA systems, it is expected that modest adsorption (e.g., about 4.8 bars) and desorption (e.g., about 0.6096 bars) pressures can be used such that capital and operating costs of the helium recovery system can thereby be reduced.

In accordance with the present invention, improved adsorber configurations and cycles are therefore disclosed for use in multiple (e.g., two) stage PSA or VPSA systems for recovering helium from low helium-containing feed gases. In addition, a temperature swing adsorption (TSA) system can be utilized upstream of the two stage PSA or VPSA systems to remove heavy contaminants such as $H_2S$, hydrocarbons (e.g., $C_4^+$) and the like. As mentioned hereinabove and as discussed below, the waste gas (or stage one VPSA tail gas) from the stage one VPSA system is preferably used as the regeneration gas for the upstream TSA system, and the waste gas (or stage two VPSA tail gas) from the stage two VPSA system is preferably recycled back to the first stage feed. As also discussed herein, the present invention is expected to provide for the use of improved layered bed configurations of the various adsorbents to achieve improved helium recovery at reduced capital and operating costs.

BRIEF DESCRIPTION OF THE DRAWINGS

FIG. 1 shows a schematic of a helium recovery system using a temperature swing adsorption (TSA) system upstream of two vacuum pressure swing adsorption (VPSA) systems in accordance with one embodiment of the present invention.

FIG. 2 shows an exemplary TSA bed configuration for use in accordance with the present invention.

FIG. 3 illustrates a three bed TSA system used for heavy components (e.g., $C_6^+$ hydrocarbons, $H_2S$) removal from various feed gases in accordance with the present invention.

FIG. 4 shows a TSA cycle for the TSA system of FIG. 3.

FIG. 5 illustrates a two stage PSA bed arrangement depicting layers of adsorbents used in first and second stage PSA systems.

FIG. 6 shows a four adsorbent bed configuration for a stage one VPSA system and process in accordance with the present invention.

FIG. 7 shows a stage one VPSA cycle for the VPSA system of FIG. 6.

FIG. 8 shows a four adsorbent bed configuration for a stage two VPSA system in accordance with the present invention.

FIG. 9 shows a stage two VPSA cycle for the VPSA system of FIG. 8.

FIG. 10 shows a computer-simulated comparison of the two stage helium recovery process of the present invention using layered beds of adsorbents and improved VPSA cycles versus the prior art helium recovery cycles disclosed in U.S. Pat. No. 5,542,966 by D'Amico et al.

FIG. 11 shows an alternative embodiment of the present invention using a stage two VPSA system without the upstream TSA system shown in FIG. 1.

FIG. 12 shows another alternative embodiment of the present invention using a modified version of FIG. 11 for the case where the feed gas contains $H_2$.

DETAILED DESCRIPTION OF THE INVENTION

The present invention provides method and systems for recovering helium from low helium-containing feed gases. As already mentioned, low helium-containing gases contain less than about 10 volume % helium, and more typically, less than about 5% helium by volume. In accordance with some embodiments of the invention, two stages of PSA or VPSA systems, with each system having a distinct cycle, are provided. Such embodiments could include two PSA systems, two VPSA systems or a combination of a PSA or VPSA system. In addition, it is expected that more than two stages of PSA and/or VPSA systems could be implemented according to the invention. In alternative embodiments of the invention, any of the embodiments of the multiple (e.g., two) stage PSA or VPSA systems can include a TSA system upstream of the first stage for pretreatment of the feed gases. In preferred embodiments of the invention, the PSA or VPSA first stage system provides regeneration gas for the TSA system, and/or the PSA or VPSA second stage tail gas is recycled to the first stage VPSA system.

Each stage of the PSA or VPSA systems contain multiple (e.g. four) beds, each bed containing one or more layers of adsorbents. The adsorbents are chosen to selectively adsorb at least one component in the feed stream. Adsorbents can further be selected to be placed within the TSA or one of the stages of the PSA or VPSA systems depending on the type of adsorbate to be removed. For example and depending on the type of feed gas and contaminants to be removed therefrom, the TSA can be used to remove contaminants that would degrade the adsorbents in the downstream PSA or VPSA system(s).

Depending on the type of feed gas and the system and process being used, the present invention can include some or all of the following features. Each bed in the stage one PSA or VPSA system can include three layers of adsorbents, and each bed in stage two can preferably include a weak adsorbent (e.g., activated carbon or 5A zeolite) and a strong adsorbent (e.g., VSA-6 zeolite, LiX zeolite, CaX zeolite, or Z10-08 or Z10-08EP zeolites (both Z10-08 or Z10-08EP zeolites by Zeochem LLC) positioned on top of the weak adsorbent. Stage two also preferably includes an adsorbent such as alumina positioned upstream of the weak adsorbent (which can provide for adsorption and/or flow distribution). Such adsorbent configurations are in contrast to some prior art systems which have utilized activated carbon beds in each bed of stages one and two of the VPSA systems for helium recovery. High performance and layered beds of adsorbents are used in the TSA and VPSA systems of the present invention to achieve improved helium recoveries and throughputs. In addition, adsorbents selective for heavy contaminants present in the feed gas can be selected and arranged in the TSA system to suppress degradation of the stage one PSA or VPSA system adsorbents. Each stage of the PSA or VPSA system preferably contains four adsorbent beds utilizing different PSA or VPSA cycles with full synchronization between the stages to handle various streams to continuously deliver high purity helium product. In the aforementioned embodiments having layered beds of selected adsorbents in the two stage VPSA systems, it is expected that modest adsorption (e.g., about 4.8 bars) and desorption (e.g., about 0.6096 bars) pressures can be used such that capital and operating costs of the helium recovery system can thereby be reduced.

The helium-containing feed gas typically contains large concentrations of $N_2$ and trace quantities of hydrocarbons, making prior art systems that use carbon beds for heavy contaminant removal inefficient, uneconomical or unsustainable as the presence of some heavy hydrocarbons or other heavy contaminants can degrade the carbon adsorbents. Use of a TSA system upstream of the multiple stage PSA or VPSA systems can therefore allow for removal of such contaminants and regeneration of the selected adsorbents.

The systems of the present invention are expected to provide a smaller system footprint, lower capital cost and lower operating cost than prior art systems. In some cases, it is expected that about 24% more throughput and about 10% higher helium recovery could be achieved using the helium recovery systems of the present invention.

Various adsorbents could be utilized in accordance with the TSA and PSA or VPSA systems of the present invention. The adsorbents are selected to remove various heavy contaminants and impurities and/or other components present in the low helium-containing feed gas. For example and while not to be construed as limiting, aluminosilicates such as HiSiv adsorbent (e.g. HiSiv-3000) (from UOP, LLP of Des Plaines, Ill., referred to as "UOP") or ZSM 5 supported on gamma alumina, titanium silicates such as ETS-10 (from Engelhard, which is now BASF Catalysts, LLC) and activated carbons such as BAX-1100 (from Westvaco, Corporation) and combinations thereof could be used for $C_6^+$ hydrocarbons removal in the adsorber beds. Clinoptilolite (e.g., barium ion exchanged clinoptilolite) (from UOP, LLP of Des Plaines, Ill.) is also expected to be suitable for use in accordance with the present invention for some feed streams (for example, for $H_2S$ removal). In addition, alumina may also be used for contaminant removal (including water) and/or to provide for flow distribution. Selection of such adsorbents, combinations of such adsorbents and the layering or configurations within the beds of the adsorbers can vary depending on the impurities or heavy contaminants to be removed from the feed gas, the concentrations of such impurities or heavy contaminants and the like.

It should be noted, however, that activated carbon adsorbents are not likely to be preferred for use in the TSA systems where the temperature swings between adsorption and desorption steps are high enough to cause unacceptable or undesirable carbon adsorbent degradation. Aluminosilicates such as HiSiv adsorbents, ZSM 5 supported on gamma alumina, titanium silicates such as ETS-10, clinoptilolite (e.g., barium ion exchanged clinoptilolite) and/or alumina adsorbents are therefore likely to be preferred in the TSA systems and processes over the activated carbons because of their better thermal and hydrothermal stability.

In addition, activated or treated activated carbon such as Centaur® carbon from (from Calgon Corporation) or Selexorb® COS (from BASF) may be suitable for SOx, NOx and/or $H_2S$ removal. In addition, silica gel could be used for removing $C_2$-$C_5$ impurities. Depending on the feed gas composition and the concentration of the impurities, the removal of $C_2$-$C_5$ adsorbents could be accomplished in the TSA system and/or the PSA or VPSA stage one systems. While not to be construed as limiting, SOx and NOx are likely to be removed in the TSA system.

Activated carbon adsorbents can be used for example in the PSA or VPSA systems for $CH_4$ and $CO_2$ removal. The PSA or VPSA systems could also include alumina upstream of such adsorbents for water removal. Zeolites such as 5A, Li—X, or H-15 (from UOP) can be used to remove components such as $N_2$ and CO (and any oxygen and/or argon present in the helium-containing stream) to produce high purity (preferably >99.9% from the second stage PSA or VPSA). First stage effluent in accordance with the present invention is expected to be about 70-90% helium by volume.

In accordance with the present invention, adsorbents can therefore be selected for use in the TSA system for heavy contaminant removal. In addition, adsorbents can be selected for use in the multiple stage PSA or VPSA systems for removal of adsorbates such as $N_2$, $CH_4$, $CO_2$, $O_2$, Ar, residual $H_2O$ and residual hydrocarbons.

Referring now to FIG. 1, a schematic of a helium recovery system and process using a temperature swing adsorption (TSA) system upstream of two vacuum pressure swing adsorption (VPSA) systems is illustrated. The system shown in FIG. 1 includes TSA system 12 and VPSA stage one system 24 coupled to VPSA stage two system 38. As described herein, TSA system 12 receives feed gas 14 and produces TSA waste 16 and a helium-containing pretreated feed gas effluent 18. Effluent 18 is fed to buffer tank 20 such that feed gas 22 can be provided to VPSA stage one system 24. Waste 16 from the TSA system is sent to the flare stack or scrubbers or exhaust vent.

VPSA stage one system 24 produces helium-containing purified feed gas effluent gas 32, which is provided to buffer tank 34 and tail gas 26. Tank 34 is used to smooth transients and provide feed gas 36 to VPSA stage two system 38. As can be seen from FIG. 1, at least a portion 26a of the waste gas 26 from the VPSA stage one process can be used as the regeneration gas 30 for the upstream TSA system 12. Buffer tank 28 is provided to smooth transients in the system. The remainder 26b of tail gas 26 can be discarded as waste gas.

VPSA stage two system 38 produces a high purity helium gas 40. As further shown in FIG. 1, waste (or tail gas) 42 can be compressed in recycle compressor 44 and returned to VPSA stage one as stream 46. Stream 46 can be combined with effluent 18 and used as feed gas 22.

If hydrogen is present in the feed gas, a deoxo unit and water removal unit such as shown in FIG. 12 can also be included (for example, between stage one VPSA system 24 and stage two VPSA system 38).

FIG. 2 shows the details for one adsorber bed 50 in an exemplary TSA process in accordance with the present invention. In a preferred mode of operation, the TSA system is used for the removal of the heavy impurities such as BTX (benzene, toluene and/or xylene), $H_2O$, $H_2S$, $NH_3$ and HCl and heavier hydrocarbons $C_5^+$ contained in various feed gases. In some instances, however, where the feed gas contains $C_2$-$C_5$ hydrocarbons but does not contain $C_6^+$ hydrocarbons, the $C_2$-$C_5$ hydrocarbons can be removed by silica gel adsorbent upstream of activated carbon adsorbent in the PSA or VPSA system. In this instance, the silica gel suppresses degradation of the carbon adsorbent due to irreversible adsorption of the $C_4^+$ hydrocarbons. Referring to FIG. 2, S1 adsorbent (e.g., HiSiv 3000, alumina, ETS-10) and S2 adsorbent (e.g., barium ion exchanged clinoptilolite) can be used in each bed of the three beds of the TSA system. Alternatively and depending on the feed gas composition and concentrations of impurities, S1 could for example be a layer of alumina and S2 could for example be a layer of clinoptilolite (e.g., preferably barium ion exchanged clinoptilolite).

As can be seen from FIG. 2, feed gas 14 is preferably fed to the top of the adsorber and effluent 18 is removed from the bottom of the adsorber while waste gas 16 is removed from the top of the adsorber. Regeneration gas(es) 30/48 flows through the adsorbers to perform the associated heating and cooling steps as disclosed in Table 1. It will be appreciated that the flow directions could be reversed.

FIG. 3 illustrates a three bed temperature swing adsorption (TSA) system and process suitable for removal of heavy contaminants (e.g., $C_6^+$ hydrocarbons, $H_2S$) from various helium-containing feed gases in accordance with the invention. The TSA system can also be referred to as a pretreatment system for the downstream two stage VPSA systems. Referring to FIG. 3, the pretreatment beds 50a, 50b and 50c are arranged in parallel, so that when one pretreatment bed is online to remove heavy impurities (e.g., $C_6^+$ hydrocarbons and $H_2S$) from the feed gas, the other beds are undergoing the regeneration steps (heating and cooling).

As can be seen from FIG. 3, the three bed TSA pretreatment system includes three-adsorber beds, ON/OFF valves and associated piping and fittings. The valve switching logic for the pretreatment three bed TSA process is shown below in Table 1. Referring to Table 1 and FIG. 3, one embodiment of the pretreatment system (or TSA process) in accordance with the present invention is provided over one complete TSA cycle.

TABLE 1

Valve Firing Sequence for Three Bed TSA Pretreatment System of FIG. 3.

| | Step | | |
|---|---|---|---|
| | 1 | 2 | 3 |
| PB1 | Online | Heating | Cooling |
| PB2 | Cooling | Online | Heating |
| PB3 | Heating | Cooling | Online |
| Valve No. | | | |
| V1 | O | C | C |
| V2 | C | O | C |
| V3 | C | C | O |
| V4 | C | C | O |
| V5 | O | C | C |
| V6 | C | O | C |
| V7 | C | C | O |
| V8 | O | C | C |
| V9 | C | O | C |
| V10 | C | O | C |
| V11 | C | C | O |
| V12 | O | C | C |
| V13 | O | C | C |
| V14 | C | O | C |
| V15 | C | C | O |
| V16 | C | O | C |
| V17 | C | C | O |
| V18 | O | C | C |
| V19 | O | O | O |
| V20 | C | C | C |

Online: Adsorption step for heavy components removal.
Heating is counter-current with respect to feed direction.
Cooling is co-current with respect to feed direction.
C = valve in closed position
=valve in opened position Step No. 1

In step 1, the first pretreatment bed 50a (PB1) is receiving compressed feed gas 14 via feed compressor 52. During this step, valves 1 and 13 (V1 and V13) are in the open positions. The compressed feed gas flows through the first pretreatment bed 50a (PB1) to remove heavy components. Thus, the first pretreatment bed 50a is online, and heavy components such as $H_2O$ and $H_2S$ are removed by S1 adsorbent (e.g., alumina) and S2 adsorbent (e.g., HiSiv 3000, ETS, or clinoptilolite, such as barium ion exchanged clinoptilolite). S1 and S2 can vary depending on the feed gas composition and impurity concentrations therein. During the time bed 50a (PB1) is online, the second pretreatment bed 50b (PB2) is in the cooling step (valves V5 and V8 are opened), and the third pretreatment bed 50c (PB3) is in the heating step (valves V12, V18, and V19 are opened). The effluent obtained during the co-current cooling step (co-current with respect to feed step) of the second pretreatment bed 50b (PB2) is heated by the process regenerator heater 54 prior to passing to the third pretreatment bed 50c (PB3) that is undergoing the countercurrent (with respect to feed) heating step. The purging gas 48 for bed regeneration can be obtained from an external source (e.g., nitrogen) or the stage one VPSA tail gas. In the preferred mode of operation, the regeneration gas is preferably from the VPSA stage one recycle tail gas 30. If there is insufficient tail gas 30, then external gas 48 can be added as additional regeneration gas for the TSA system. The effluent 18 from the first pretreatment bed 50a (PB1), is passed to the PSA or VPSA process, via valve 13 (V13).

Step No. 2

In step 2, the second pretreatment bed 50b (PB2) is receiving compressed feed gas 14, via feed compressor 52. During this step, valves 2 and 14 (V2 and V14) are in the open positions. The compressed feed gas flows through the second pretreatment bed 50b (PB2) to remove heavy components. Thus, the second pretreatment bed 50b is online, and heavy components such as $H_2O$ and $H_2S$ are removed by S1 adsorbent (e.g., alumina) and S2 adsorbent (e.g., e.g., HiSiv 3000, ETS, or clinoptilolite, such as barium ion exchanged clinoptilolite). During the time bed 50b (PB2) is online, the third pretreatment bed 50c (PB3) is in the cooling step (valves V6 and V9 opened), and the first pretreatment bed 50a (PB1) is in the heating step (valves V10, V16, and V19 opened). The effluent obtained during the co-current cooling step (co-current with respect to feed step) of the third pretreatment bed 50c (PB3) is heated by the process regenerator heater 54 prior to passing to the first pretreatment bed 50a (PB1) that is undergoing the countercurrent (with respect to feed) heating step. The purging gas 48 for bed regeneration can be obtained from an external source (e.g., nitrogen) or the stage one VPSA tail gas. In the preferred mode of operation, the regeneration gas is preferably from the VPSA stage one recycle tail gas 30. If there is insufficient tail gas 30, then external gas 48 can be added as additional regeneration gas for the TSA system. The effluent 18 from the second pretreatment bed 50b (PB2), is passed to the PSA or VPSA process, via valve 14 (V14).

Step No. 3

In step 3, the third pretreatment bed 50c (PB3) is receiving compressed feed gas 14, via feed compressor 52. During this step, valves 3 and 15 (V3 and V15) are in the open positions. The compressed feed gas flows through the third pretreatment bed 50c (PB3) to remove heavy components. Thus, the third pretreatment bed is online, and heavy components such as $H_2O$ and $H_{25}$ are removed by S1 adsorbent (e.g., alumina) and S2 adsorbent (e.g., HiSiv 3000, ETS, or clinoptilolite, such as barium ion exchanged clinoptilolite). During the time bed 50c (PB3) is online, the first pretreatment bed 50 a (PB1) is in the cooling step (valves V4 and V7 are opened), and the second pretreatment bed 50b (PB2) is in the heating step (valves V11, V17, and V19 are opened). The effluent obtained during the co-current cooling step (co-current with respect to feed step) of the first pretreatment bed 50a (PB 1) is heated by the process regenerator heater 54 prior to passing to the second pretreatment bed 50b (PB2) that is undergoing the countercurrent (with respect to feed) heating step. The purging gas 48 for bed regeneration can be obtained from an external source (e.g., nitrogen) or the stage one VPSA tail gas. In the preferred mode of operation, the regeneration gas is preferably from the VPSA stage one recycle tail gas 30. If there is insufficient tail gas 30, then external gas 48 can be added as additional regeneration gas for the TSA system. The effluent 18 from the third pretreatment bed 50c (PB3) is passed to the PSA or VPSA stage one system.

FIG. 4 shows the TSA cycle for the TSA system of FIG. 3. It can be noted from FIGS. 3 and 4 and from Table 1 that the three beds operate in parallel, and during ⅓ of the total cycle time, one of the beds is in the adsorption step (online), while the other beds are undergoing the heating/cooling steps. Thus, the pretreatment system of FIG. 3, using the valve logic in Table 1, delivers a continuous feed stream 18 to the downstream PSA or VPSA stage one process and system. As noted above, in the preferred mode of operation, the feed flow is downward into the TSA adsorber beds, and the S1 and S2 adsorbents are placed in TSA beds for heavy contaminant removal while the other adsorbents (e.g., silica gel, activated carbons and zeolites) are contained in VPSA beds positioned downstream of the TSA beds.

Referring now to FIG. 5, a two stage PSA bed arrangement depicting layers of adsorbents used in first and second stage PSA systems is shown. More specifically, FIG. 5 shows the layered bed design for use in stages one and two adsorbers in accordance with an embodiment of the present invention. Depending on the feed gas, three layers of adsorbents may preferably be used in each of the VPSA process. As mentioned above, the sources of low helium-containing gas can come from natural gas wells or natural gas streams in which the methane has been removed (or substantially removed). For simplicity and clarity and for purposes of illustration in disclosing the features of the present invention, a feed gas containing the following composition by volume % is considered: 4.25% He, 83.478% $N_2$, 7.661% $CO_2$, 0.4% $O_2$, 0.6% $H_2O$, 2.762% $CH_4$, 0.265% ethane, 0.25% propane, 0.056% i-butane, 0.103% n-butane, 0.043% i-pentane, 0.041% n-pentane and 0.091% $C_6^+$. Thus for example, using the aforementioned feed composition, the feed gas can be passed through the TSA system (see FIG. 3) to remove the heavy contaminants such as i-pentane, n-pentane and $C_6^+$ prior to passing to the downstream two stage VPSA systems. Each stage of downstream VPSA system preferably contains four adsorbent beds.

FIG. 6 shows four adsorbent beds 56a-56d (B1, B2, B3 and B4) and associated valves and conduits of the VPSA stage one system and process. In FIG. 6, the first stage (stage 1) VPSA system has three layers of adsorbents in each bed, for example alumina in layer 1, activated carbon in layer 2, and zeolite in layer 3. In some modes of operation, VPSA stage one beds therefore include alumina at the feed end followed by activated carbon for the removal of $CO_2$ and $CH_4$, and then zeolite for the removal of bulk $N_2$. If $C_2$-$C_5$ hydrocarbons are present in the stage one feed gas composition, a layer of silica gel is preferably included between the alumina and carbon layers for removal of the $C_2$-$C_5$ hydrocarbons. FIG. 7 shows the VPSA stage one cycle for the VPSA system of FIG. 6. Referring to FIGS. 1, 5, 6 and 7, a VPSA stage one process used in helium recovery in accordance with the invention is provided over one complete VPSA cycle, and the VPSA valve switching and steps are given in Tables 2 and 3, respectively.

Stage 1 VPSA Process Steps (FIGS. 6 and 7)

Step 1 (AD1): Bed 56a (B1) is in the first adsorption step (AD1) at about 4.8 bars, while bed 56b (B2) is undergoing countercurrent blowdown (BD), bed 56c (B3) is undergoing the first equalization falling step (EQ1DN), and bed 56d (B4) is undergoing the second pressure equalization rising step (EQ2UP).

Step 2 (AD2/PP1): Bed 56a (B1) is in the second adsorption step (AD2) and is also supplying product gas to bed 56d (B4) that is undergoing the first product pressurization (PP1) step. During the same time, beds 56b (B2), 56c (B3) and 56d (B4) are undergoing purge, cocurrent depressurization and first product pressurization, respectively.

Step 3 (AD3/PP2): Bed 56a (B1) is in the third adsorption step (AD3), and is also supplying product gas to bed 56d (B4) that is undergoing the second product pressurization (PP2) step. During the same time period, beds 56b (B2), 56c (B3) and 56d (B4) are undergoing the first equalization rising step at the feed end (bottom EQ1UP), second equalization falling (bottom EQ2DN) step at the feed end, and second product pressurization step (PP2), respectively.

Step 4 (EQ1DN or top-to-top bed equalization): Bed 56a (B1) is undergoing the first equalization falling step (EQ1DN), while bed 56b (B2) receives the gas from bed 56a (B1) and is undergoing the second equalization rising step (EQ2UP). Beds 56c (B3) and 56d (B4) are now undergoing blowdown (BD) and the first adsorption step (AD1), respectively.

Step 5 (PPG): Bed 56a (B1) is undergoing cocurrent depressurization step to provide purge gas (PPG) to bed 56c (B3), while beds 56b (B2) and 56d (B4) are undergoing first product pressurization (PP1) and the second adsorption step (AD2), respectively.

Step 6 (EQ2DN or bottom-to-bottom bed equalization): Bed 56a (B1) undergoes a second equalization falling step at the feed end (EQ2DN) by sending low pressure equalization gas (feed end) to bed 56c (B3) that is undergoing the first equalization rising (EQ1UP) step. Beds 56b (B2) and 56d (B4) are undergoing the second product pressurization (PP2) and third adsorption step (AD3), respectively.

Step 7 (BD): Beds 56a (B1) and 56b (B2) undergo the countercurrent blowdown (BD) and first adsorption (AD1) step, respectively. During this time beds 56c (B3) and 56d (B4) are undergoing bed-to-bed equalization, i.e., beds 56c (B3) and 56d (B4) are undergoing the second equalization rising (Eq2UP) and first equalization falling (EQ1DN) steps, respectively.

Step 8 (PG): Bed 56a (B1) is now receiving purge gas (PG) from bed 56d (B4), and beds 56b (B2) and 56c (B3) are undergoing the second adsorption step (AD2) and first product pressurization (PP1) step, respectively.

Step 9 (EQ1UP or bottom-to-bottom bed equalization): Bed 56a (B1) is undergoing the first equalization rising step (EQ1UP) by receiving low pressure equalization gas (feed end) from bed 56d (B4) that is undergoing the second equalization falling step (EQ2DN) at the feed end. During the same time, beds 56b (B2) and 56c (B3) are undergoing the third adsorption step (AD3) and the second product pressurization (PP2), respectively.

Step 10 (EQ2UP or top-to-top bed equalization): Bed 56a (B1) is undergoing the second equalization rising step (EQ2UP) by receiving high pressure equalization gas from bed 56b (B2) that is undergoing the first equalization falling step (EQ1DN). During the same time, beds 56c (B3) and 56d (B4) are undergoing the first adsorption (AD1) step and countercurrent blowdown step, respectively.

Step 11 (PP1): Bed 56*a* (B1) is receiving first product pressurization (PP1) gas from bed 56*c* (B3) that is also in the second adsorption step (AD2), while bed 56*b* (B2) is undergoing cocurrent depressurization step to provide purge gas (PPG) to bed 56*d* (B4).

Step 12 (PP2): Bed 56*a* (B1) is receiving second product pressurization (PP2) gas from bed 56*c* (B3) that is also in the third adsorption step (AD3). During the same time, bed 56*b* (B2) undergoes a second equalization falling step (EQ2DN) at the feed end, by sending low pressure equalization gas to bed 56*d* (B4) (feed end) that is undergoing the first equalization rising (EQ1UP) step.

During the adsorption (AD) steps, product that is not supply product gas to another bed undergoing product pressurization is being supplied to buffer tank 34 and subsequently as stage two VPSA system feed 36. The control valve shown in FIG. 6 can be used to control or moderate the flow going to stage 2. In addition, the tail gas 26 from the four beds can be sent to the flare stack or scrubbers or exhaust vent and/or recycled to the TSA system as discussed above via vacuum pump (VP) 60. PV-1 and PV-2 are process control valves that can control or modulate the flow of gas going in and out of the beds.

A summary of the aforementioned twelve steps are given in Tables 2 and 3. In particular, Table 2 summarizes the valve sequence over one complete cycle for the four bed PSA process shown in FIGS. 6 and 7, and Table 3 gives the respective time intervals and the corresponding status of each bed during one complete PSA cycle. It can be seen from Tables 2 and 3 that the four beds operate in parallel, and during ¼ of the total cycle time one of the beds is in the adsorption step, while the other beds are each undergoing one of the other steps as disclosed in the VPSA cycle.

Table 4 gives an example of the operating conditions and the VPSA process performance using three layers of adsorbents (alumina, silica gel or activated carbon, and zeolite), in each adsorber of the four bed VPSA system and process shown in FIG. 6. In this example, the first layer (layer 1 in FIG. 6) is 1.0 ft of alumina, followed by 5.0 ft of activated carbon (layer 2 in FIG. 6), then 5.0 ft of UOP VSA-6 zeolite (layer 3 in FIG. 6). In the table, the symbols have the following meaning. kPa=1000 Pa=S.I. unit for pressure (1.0 atm.=101.323 kPa), s=time unit in seconds. In addition, the VPSA stage one waste gas (or tail gas), obtained during the regeneration steps of the VPSA stage one cycle (FIG. 7), is used as regeneration gas for the upstream TSA process in FIG. 3.

TABLE 2

Stage 1 Four Bed VPSA Valve Switching (O = OPENED, C = CLOSED)

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 1 (BD1) | AD1 | AD2/PP1 | AD3/PP2 | EQ1DN | PPG | EQ2DN | BD | PG | EQ1UP | EQ2UP | PP1 | PP2 |
| Bed 2 (BD2) | BD | PG | EQ1UP | EQ2UP | PP1 | PP2 | AD1 | AD2/PP1 | AD3/PP2 | EQ1DN | PPG | EQ2DN |
| Bed 3 (BD3) | EQ1DN | PPG | EQ2DN | BD | PG | EQ1UP | EQ2UP | PP1 | PP2 | AD1 | AD2/PP1 | AD3/PP2 |
| Bed 4 (BD4) | EQ2UP | PP1 | PP2 | AD1 | AD2/PP1 | AD3/PP2 | EQ1DN | PPG | EQ2DN | BD | PG | EQ1UP |
| Valve No. | | | | | | | | | | | | |
| V31 | O | O | O | C | C | C | C | C | C | C | C | C |
| V32 | C | C | C | C | C | C | O | O | O | C | C | C |
| V33 | C | C | C | C | C | C | C | C | C | O | O | O |
| V34 | C | C | C | O | O | O | C | C | C | C | C | C |
| V35 | O | O | C | O | O | C | O | O | C | O | O | C |
| V36 | C | C | C | C | C | C | O | O | C | C | C | C |
| V37 | O | O | C | C | C | C | C | C | C | O | O | C |
| V38 | C | C | C | O | O | C | C | C | C | C | C | C |
| V39 | C | C | C | C | C | C | C | C | C | O | O | C |
| V40 | C | O | O | C | O | O | C | O | O | C | O | O |
| V41 | O | O | O | C | C | C | C | C | C | C | C | C |
| V42 | C | C | C | C | C | C | O | O | O | C | C | C |
| V43 | C | C | C | C | C | C | C | C | C | O | O | O |
| V44 | C | C | C | O | O | O | C | C | C | C | C | C |
| V45 | C | C | C | C | O | C | C | O | C | C | C | C |
| V46 | C | O | C | C | C | C | C | C | C | C | O | C |
| V47 | C | O | C | C | C | C | C | C | C | C | C | C |
| V48 | C | C | C | C | C | C | O | C | C | O | C | C |
| V49 | C | C | C | O | C | C | C | C | C | O | O | O |
| V50 | C | C | C | O | O | O | C | C | C | O | C | C |
| V51 | O | C | C | C | C | C | O | O | O | C | C | C |
| V52 | O | O | O | C | C | C | C | C | C | C | C | C |
| V53 | C | C | C | C | C | O | C | C | O | C | C | C |
| V54 | C | C | O | C | C | C | C | C | C | C | C | O |
| V55 | C | C | O | C | C | O | C | C | C | C | C | C |
| V56 | C | C | C | C | C | C | C | O | C | C | C | O |
| V57 | O | O | O | O | O | O | O | O | O | O | O | O |
| V58 | C | C | C | C | C | C | C | C | C | C | C | C |

TABLE 3

Time Interval and Step Sequence of Stage 1 VPSA Cycle (FIG. 7)

| Step Number | Time Interval | BED #1 | BED #2 | BED #3 | BED #4 |
|---|---|---|---|---|---|
| 1 | 0-25 | AD1 | BD | EQ1DN | EQ2UP |
| 2 | 25-45 | AD2/PP1 | PG | PPG | PP1 |
| 3 | 45-60 | AD3/PP2 | EQ1UP | EQ2DN | PP2 |
| 4 | 60-85 | EQ1DN | EQ2UP | BD | AD1 |
| 5 | 85-105 | PPG | PP1 | PG | AD2/PP1 |
| 6 | 105-120 | EQ2DN | PP2 | EQ1UP | AD3/PP2 |
| 7 | 120-145 | BD | AD1 | EQ2UP | EQ1DN |
| 8 | 145-165 | PG | AD2/PP1 | PP1 | PPG |
| 9 | 165-180 | EQ1UP | AD3/PP2 | PP2 | EQ2DN |
| 10 | 180-205 | EQ2UP | EQ1DN | AD1 | BD |
| 11 | 205-225 | PP1 | PPG | AD2/PP1 | PG |
| 12 | 225-240 | PP2 | EQ2DN | AD3/PP2 | EQ1UP |

AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or bottom-to-bottom bed equalization
BD = Blowdown
PG = Purge
EQ1UP = First Equalization Up or bottom-to-bottom bed equalization
EQ2UP = Second Equalization Up or top-to-top bed equalization
PP1 = First Product Pressurization
PP2 = Second Product Pressurization Table 4 (Stage 1 Four Bed VPSA Process Details):

An example of the operating conditions and the VPSA process performance using 1.0 ft alumina (layer 1), 5.0 ft activated carbon (layer 2), and 5 ft of VSA6 zeolite (layer 3) in a layered bed arrangement in the four bed VPSA process of FIGS. 6 and 7 (bed diameter=9.0 ft) is provided. The results shown below were obtained from computer simulation using a feed mixture of 4.25% He, 83.48% $N_2$, 11.27% $CO_2$, 0.4% $O_2$, 0.6% $H_2O$. (Upstream TSA process removes ethane, propane, i-butane, n-butane, i-pentane, n-pentane and $C_6^+$ and the like):

| | |
|---|---|
| Cycle time (s) | 240 |
| Adsorbent in first layer of Bed | alumina |
| Amount of alumina (lb/bed): | 3,054 |
| Adsorbent in second layer of bed: | activated carbon |
| Amount of activated carbon (lb/bed): | 9,976 |
| Adsorbent in third layer of bed: | VSA-6 |
| Amount of VSA-6 zeolite (lb/bed): | 13,147 |
| High Pressure: | 480 kPa |
| Low Pressure: | 60.96 kPa |
| Feed Flowrate: | 3022.36 scfm |
| Helium Purity: | 90% (Feed to Stage 2 VPSA) |
| PSA Per Pass Helium Recovery: | 65% |
| Stage 1 Tail Gas (for TSA Regen.) | ~86% $N_2$, 2.3% He, 11.4% $CO_2$ |
| Temperature: | 308 K |

FIG. 8 shows four adsorbent beds 58a-58d (B1, B2, B3 and B4) and associated valves and conduits for a VPSA stage two system and process in accordance with the present invention. In FIG. 8, the VPSA second stage (Stage 2) system has three layers of adsorbents, for example layer 1 in stage two contains at the feed end alumina balls for flow distribution followed by activated carbon, then a strong zeolite towards the product end of the second stage beds. FIG. 9 shows the VPSA stage two cycle for the VPSA system of FIG. 8. Referring to FIGS. 1, 5, 8 and 9, the VPSA stage two process used in helium recovery is provided over one complete VPSA cycle, and the VPSA valve switching and steps are given in Tables 5 and 6, respectively.

Stage 2 VPSA Process (FIGS. 8 and 9):

Step 1 (AD1): Bed 58a (B5) is in the first adsorption step (AD1) at about 4.8 bars, while bed 58b (B6) is undergoing countercurrent blowdown (BD), bed 58c (B7) is undergoing the first equalization falling step (EQ1DN), and bed 58d (B8) is undergoing the second pressure equalization rising step (EQ2UP).

Step 2 (AD2/PP1): Bed 58a (B5) is in the second adsorption step (AD2) and is also supplying product gas to bed 58d (B8) that is undergoing the first product pressurization (PP1) step. During the same time, beds 58b (B6), 58c (B7) and 58d (B8) are undergoing purge, cocurrent depressurization and first product pressurization, respectively.

Step 3 (AD3/PP2): Bed 58a (B5) is in the third adsorption step (AD3), and is also supplying product gas to bed 58d (B8) that is undergoing the second product pressurization (PP2) step. During the same time period, beds 58b (B6), 58c (B7) and 58d (B8) are undergoing the first equalization rising step at the feed end (bottom EQ1UP), second equalization falling (bottom EQ2DN) step at the product end, and second product pressurization step (PP2), respectively.

Step 4 (EQ1DN or top-to-top bed equalization): Bed 58a (B5) is undergoing the first equalization falling step (EQ1DN), while bed 58b (B6) receives the gas from bed 58a (B5) and is undergoing the second equalization rising step (EQ2UP). Beds 58c (B7) and 58d (B8) are now undergoing blowdown (BD) and the first adsorption step (AD1), respectively.

Step 5 (PPG): Bed 58a (B5) is undergoing cocurrent depressurization step to provide purge gas (PPG) to bed 58c (B7), while beds 58b (B6) and 58d (B8) are undergoing first product pressurization (PP1) and the second adsorption step (AD2), respectively.

Step 6 (EQ2DN or top-to-bottom bed equalization): Bed 58a (B5) undergoes a second equalization falling step at the product end (EQ2DN) by sending low pressure equalization gas to bed 58c (B7) that is undergoing the first equalization rising (EQ1UP) step at the feed end. Beds 58b (B6) and 58d (B8) are undergoing the second product pressurization (PP2) and third adsorption step (AD3), respectively.

Step 7 (BD): Beds 58a (B5) and 58b (B6) undergo the countercurrent blowdown (BD) and first adsorption (AD1) step, respectively. During this time, beds 58c (B7) and 58d (B8) are undergoing bed-to-bed equalization, i.e., beds 7 and 8 are undergoing the second equalization rising (Eq2UP) and first equalization falling (EQ1DN) steps, respectively.

Step 8 (PG): Bed 58a (B5) is now receiving purge gas (PG) from bed 58d (B8), and beds 58b (B6) and 58c (B7) are undergoing the second adsorption step (AD2) and first product pressurization (PP1) step, respectively.

Step 9 (EQ1UP or top-to-bottom bed equalization): Bed 58a (B5) is undergoing the first equalization rising step (EQ1UP) by receiving low pressure equalization gas (feed end) from bed 58d (B8) that is undergoing the second equalization falling step (EQ2DN) at the product end. During the same time, beds 58b (B6) and 58c (B7) are undergoing the third adsorption step (AD3) and the second product pressurization (PP2), respectively.

Step 10 (EQ2UP or top-to-top bed equalization): Bed 58a (B5) is undergoing the second equalization rising step (EQ2UP) by receiving high pressure equalization gas from bed 58b (B6) that is undergoing the first equalization falling step (EQ1DN). During the same time, beds 58c (B7) and 58d (B8) are undergoing the first adsorption (AD1) step and countercurrent blowdown step, respectively.

Step 11 (PP1) Bed 58a (B5) is receiving first product pressurization (PP1) gas from bed 58c (B7) that is also in the second adsorption step (AD2), while bed 58*b* (B6) is undergoing cocurrent depressurization step to provide purge gas (PPG) to bed 58*d* (B8).

Step 12 (PP2) Bed 58*a* (B5) is receiving second product pressurization (PP2) gas from bed 58*c* (B7) that is also in the third adsorption step (AD3). During the same time, bed 58*b* (B6) undergoes a second equalization falling step (EQ2DN) at the product end, by sending low pressure equalization gas to bed 58*d* (B8) (feed end) that is undergoing the first equalization rising (EQ1UP) step.

During the adsorption (AD) steps, product that is not supply product gas to another bed undergoing product pressurization is being supplied to buffer tank 64 and subsequently as product helium stream 40. The control valve shown in FIG. 8 can be used to control or moderate the flow of helium product stream 40. In addition, the tail gas from the four beds is preferably recycled as stream 42 to the stage one VPSA system as discussed above via vacuum pump (VP) 84 and compressor 44. PV-3 and PV-4 are process control valves that can control or modulate the flow of gas going in and out of the beds.

The valve switching logic for stage two of the four bed VPSA system and process (FIGS. 8 and 9) is shown in Table 5, and the duration of each step in the VPSA cycle as shown in Table 6. In particular, Table 5 summarizes the valve sequence over one complete cycle for the four bed VPSA process shown in FIG. 8, and Table 6 gives the respective time intervals and the corresponding status of each bed during one complete VPSA cycle. It can be seen from Tables 5 and 6 that the four beds operate in parallel, and during ¼ of the total cycle time one of the beds is in the adsorption step, while the other beds are each undergoing one of the other steps as disclosed in the VPSA cycle.

Table 7 (Stage 2) gives an example of the operating conditions and the VPSA process performance using three layers of adsorbents (alumina, activated carbon, and zeolite), in each adsorber of the four bed VPSA process shown in FIG. 8. The first layer (layer 1 in FIG. 8) is 1.0 ft alumina, followed by 1.0 ft activated carbon (layer 2 in FIG. 8), then 6.0 ft of VSA-6 zeolite. In the table, the symbols have the following meaning: kPa=1000 Pa=S.I. unit for pressure (1.0 atm.=101.323 kPa), s=time unit in seconds. The results shown in the table corresponds to the case where the effluent from the stage one VPSA is used as the feed gas to the stage two VPSA process.

TABLE 5

Stage Two Four Bed VPSA Valve Switching (O = OPENED, C = CLOSED)

| | Step | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Bed 5 (BD5) | AD1 | AD2/PP1 | AD3/PP2 | EQ1DN | PPG | EQ2DN | BD | PG | EQ1UP | EQ2UP | PP1 | PP2 |
| Bed 6 (BD6) | BD | PG | EQ1UP | EQ2UP | PP1 | PP2 | AD1 | AD2/PP1 | AD3/PP2 | EQ1DN | PPG | EQ2DN |
| Bed 7 (BD7) | EQ1DN | PPG | EQ2DN | BD | PG | EQ1UP | EQ2UP | PP1 | PP2 | AD1 | AD2/PP1 | AD3/PP2 |
| Bed 8 (BD8) | EQ2UP | PP1 | PP2 | AD1 | AD2/PP1 | AD3/PP2 | EQ1DN | PPG | EQ2DN | BD | PG | EQ1UP |
| Valve No. | | | | | | | | | | | | |
| V61 | O | O | O | C | C | C | C | C | C | C | C | C |
| V62 | C | C | C | C | C | C | O | O | O | C | C | C |
| V63 | C | C | C | C | C | C | C | C | C | O | O | O |
| V64 | C | C | C | O | O | O | C | C | C | C | C | C |
| V65 | O | O | C | O | O | C | O | O | C | O | O | C |
| V66 | C | C | C | C | C | C | O | O | C | C | C | C |
| V67 | O | O | C | C | C | C | C | C | C | C | C | C |
| V68 | C | C | C | O | O | C | C | C | C | C | C | C |
| V69 | C | C | C | C | C | C | C | C | C | O | O | C |
| V70 | C | O | O | C | O | O | C | O | O | C | O | O |
| V71 | O | O | O | C | C | C | C | C | C | C | C | C |
| V72 | C | C | C | C | C | C | O | O | O | C | C | C |
| V73 | C | C | C | C | C | C | C | C | C | O | O | O |
| V74 | C | C | C | O | O | O | C | C | C | C | C | C |
| V75 | C | C | C | C | O | O | C | C | O | C | C | C |
| V76 | C | O | C | C | C | C | C | C | C | C | O | O |
| V77 | C | O | O | C | O | C | C | C | C | C | C | C |
| V78 | C | C | C | C | C | C | C | O | O | C | O | C |
| V79 | C | C | C | O | C | C | C | C | C | O | O | O |
| V80 | C | C | C | O | O | O | C | C | C | O | C | C |
| V81 | O | C | C | C | C | C | O | O | O | C | C | C |
| V82 | O | O | O | C | C | C | O | C | C | C | C | C |
| V83 | C | C | C | C | C | C | C | C | O | C | C | C |
| V84 | C | C | O | C | C | C | C | C | C | C | C | C |
| V85 | C | C | C | C | C | O | C | C | C | C | C | C |
| V86 | C | C | C | C | C | C | C | C | C | C | C | O |
| V87 | O | O | O | O | O | O | O | O | O | O | O | O |

TABLE 6

Time Interval and Step Sequence of Stage 2 VPSA Cycle (FIG. 9)

| Step Number | Time Interval (sec) | BED #5 | BED #6 | BED #7 | BED #8 |
|---|---|---|---|---|---|
| 1 | 0-25 | AD1 | BD | EQ1DN | EQ2UP |
| 2 | 25-65 | AD2/PP1 | PG | PPG | PP1 |
| 3 | 65-90 | AD3/PP2 | EQ1UP | EQ2DN | PP2 |

TABLE 6-continued

Time Interval and Step Sequence of Stage 2 VPSA Cycle (FIG. 9)

| Step Number | Time Interval (sec) | BED #5 | BED #6 | BED #7 | BED #8 |
|---|---|---|---|---|---|
| 4  | 90-115  | EQ1DN | EQ2UP  | BD     | AD1    |
| 5  | 115-155 | PPG   | PP1    | PG     | AD2/PP1|
| 6  | 155-180 | EQ2DN | PP2    | EQ1UP  | AD3/PP2|
| 7  | 180-205 | BD    | AD1    | EQ2UP  | EQ1DN  |
| 8  | 205-245 | PG    | AD2/PP1| PP1    | PPG    |
| 9  | 245-270 | EQ1UP | AD3/PP2| PP2    | EQ2DN  |
| 10 | 270-295 | EQ2UP | EQ1DN  | AD1    | BD     |
| 11 | 295-335 | PP1   | PPG    | AD2/PP1| PG     |
| 12 | 335-360 | PP2   | EQ2DN  | AD3/PP2| EQ1UP  |

AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or top-to-bottom bed equalization
BD = Blowdown
PG = Purge
EQ1UP = First Equalization Up or top-to-bottom bed equalization
EQ2UP = Second Equalization Up or top-to-top bed equalization
PP1 = First Product Pressurization
PP2 = Second Product Pressurization Table 7 (Stage 2 Four Bed VPSA Process Details):

An example of the operating conditions and the VPSA process performance using 1.0 ft of alumina (layer 1), 1.0 ft of activated carbon (layer 2), and 6.0 ft of VSA-6 zeolite (layer 3) in a layered bed four bed PSA or VPSA process of FIGS. 8 and 9 (Bed diameter=3.0 ft) is provided. The results shown below were obtained from VPSA simulation results using a feed mixture 90.04% He, 0.46% $CO_2$, 1.0% $O_2$ and 8.5% $N_2$.

| | |
|---|---|
| Cycle time (s) | 360 |
| Adsorbent in first layer of Bed | alumina |
| Amount of alumina (lb/bed): | 340 |
| Adsorbent in second layer of bed: | activated carbon |
| Amount of activated carbon (lb/bed): | 222 |
| Adsorbent in third layer of bed: | VSA-6 |
| Amount of VSA6 zeolite (lb/bed): | 1,753 |
| High Pressure: | 480 kPa |
| Low Pressure: | 60.96 kPa |
| Feed Flowrate: | 196.83 scfm |
| Helium Purity: | 99.995% |
| Stage 2 Per Pass Helium Recovery: | 60% |
| Stage 2 Tail Gas (Recycle to Stage 1 feed) | 77.7% He |
| Overall Two Stage He Recovery | 95% |
| Temperature: | 310 K |

FIG. 10 shows a computer-simulated comparison of the two stage helium recovery process of the present invention using layered beds of adsorbents and improved VPSA cycles versus prior art helium recovery cycles shown in U.S. Pat. No. 5,542,966 to D'Amico et al using activated carbon beds and the VPSA operating conditions and feed streams of the present invention (i.e. using the stage one conditions and feed stream noted above in Table 4 and the stage two conditions and feed stream noted above in Table 7). As is evident from FIG. 10, the helium recovery process of the present invention is expected to have about 24% more He throughput (112 scfm vs 90 scfm) and about 10% improvement in He recovery (95% vs. 86%).

FIG. 11 shows an alternative embodiment using a two stage VPSA system without the upstream TSA system shown in FIG. 1. In this alternative mode of operation (FIG. 11), the VPSA stage one system is designed to remove the heavy contaminants (e.g. heavy hydrocarbons) that were previously taken out by the upstream TSA system of FIG. 1. Such embodiments may be possible or desirable where the heavy contaminants are capable of being removed in the VPSA system such that adsorbent regeneration of the stage one adsorbents is possible in an efficient or economic manner. For example and while not to be construed as limiting of the invention, it may be possible for silica gel adsorbent in the stage one VPSA system to remove a C6 hydrocarbon such as hexane while such an adsorbent could not be efficiently regenerated through desorption if the C6+ hydrocarbon were BTX or the like instead of hexane. When feed streams contain heavy contaminants that can be removed and the adsorbents efficiently regenerated, then the embodiment shown in FIG. 11 may be desirable. As can be seen from FIG. 11, feed 118 is introduced into buffer tank 120 and then stream 122 fed to the VPSA stage one system 124. VPSA stage one system 124 produces waste gas 126 and effluent 168. Effluent 168 is provided to stage one receiver 166 and is then fed to VPSA stage two system 138 as stream 170. VPSA stage two system 138 produces helium product stream 140 and waste tail gas 142, which can be recycled to the stage one VPSA system via recycle compressor 144 as stream 146.

FIG. 12 shows an alternative embodiment using a modified version of FIG. 11 for the case where the feed gas contains H2. In FIG. 12, a deoxo unit 172 is added for the H2 removal prior to sending stage one effluent to the stage two VPSA process. In a similar manner, the deoxo unit could be added between stage one VPSA and stage two VPSA in FIG. 1 when H2 is present in the helium-containing feed gas. More specifically, stream 170 from stage one receiver 166 and air stream 174 are introduced into deoxo unit 172 to remove H2 to produce stream 176 depleted of hydrogen. Stream 176 is then introduced into H2O removal unit 178 to produce water stream 180 and a water deficient stream 182 going to the stage two VPSA system.

Depending on the kind of impurities and concentrations of components present in the helium-containing feed gases (e.g., NH3, HCl, BTX, H2S, H2O, C1-C8 hydrocarbons, aromatics, etc), one layer or more than two layers of adsorbents may be desired in each TSA bed of FIG. 3, and the TSA process could operate in TSA or VPSA or PSA modes. Several PSA and TSA cycles using two or more beds are disclosed in the prior art (e.g., U.S. Pat. No. 4,233,038 to Tao; U.S. Pat. No. 5,614,000 to Kalbasi et al.; and U.S. Pat. No. 6,503,299 to Baksh et al.).

The teachings of the present invention can be utilized for other feed gases (e.g., H2-containing feed gases from refineries) containing heavy contaminants. Depending on the impurities present in the feed gas and the choice of adsorbents, a PSA or TSA or combination of PSA/TSA processes may be desired or required to remove the impurities from the various off-gases. For example, the TSA process in FIGS. 3 and 4 could be a two bed temperature swing adsorption (TSA) process instead of the three bed TSA process disclosed in FIGS. 3 and 4 and Table 1. Alternatively, the TSA process of FIGS. 3 and 4 could operate in TSA and PSA modes; i.e., different pressures and temperatures used during the online steps versus the heating/cooling steps. By operating the TSA process at reduced pressure during the heating/cooling steps, improved working capacities of the adsorbents could be achieved in the pretreatment system.

Referring to FIGS. 1, 3 and 4, a combination of adsorbents can be used in the TSA process when heavy components (e.g., H2S, $C_3H_8$, C4+, benzene, toluene, xylene, styrene, etc) are present in the helium-containing feed gas such as low grade natural gas. Alternative choices of adsorbents (e.g., layers S1 and S2) in FIGS. 2-4, include but are not limited to, the following: (A) wash coat of γ-Al2O3 (i.e. gamma alumina) and ZSM5 zeolite onto honeycomb/monolithic ceramic or metallic substrates or stainless steel wire meshes (see, J. Chem. Eng. Data, V48, pg 1471, 2003). The wash coat could include γ-Al2O3 (e.g., 80%) and ZSM5 zeolite (e.g., 20%). Other wash coats could be used for different heavy component impurities. In addition, the monolithic substrates composed of single solid devices having many parallel channels that may be circular, hexagonal, square, triangular or sinusoidal are also expected to be suitable for use in the invention (see e.g. U.S. patent application Ser. No. 11/644,287 to Baksh, filed Dec. 22, 2006 and entitled "Composite Structured Adsorbents" and published as U.S. Published Patent Application No. US2008-0148936 A1 on Jun. 26, 2008 as well as PCT International Patent Application No. PCT/US07/88598 entitled "Composite Structured Adsorbents", filed Dec. 21, 2007 and published on Jul. 3, 2008 as WO 2008/080080 A2; the entire contents of U.S. patent application Ser. No. 11/644,287 (and U.S. Published Patent Application No. US2008-0148936 A1) and PCT International Patent Application No. PCT/US07/88598 are incorporated herein by reference). In addition, the parameters such as cell density, geometric surface area, void fraction, hydraulic diameter, void fraction of catalyst, characteristic diffusion length, etc. can be defined for a given feed gas composition and PSA or VPSA operating conditions. (B) Pure silica Si-CHA {Diaz-Cabanas, et al., Chem. Commun., (1998) 1881} or ITQ-3 {Olson et al., Microporous and Mesoporous Materials 67 (2004) 27-33}, or high silica ZSM-58 (see U.S. Pat. No. 4,698,217). These adsorbents could also be used in the separation of propane from a propene/propane mixture or for the separation of ethane/ethene from higher hydrocarbons. (C) Sulfonated styrene/divinylbenzene resin (e.g., Ambersorb 600 from Rohm and Haas Co.). (D) HiSiv zeolites such as HiSiv 3000 from UOP. (E) Electrically conductive activated carbon monolith (e.g., Joule heating to assist in adsorbent regeneration in the PSA cycle). This choice can facilitate the use of higher desorption pressure and/or can eliminate the need for recompressing the gas returning to the fuel head in the refinery process. (F) Silica gel and highly siliceous adsorbents such as dealuminated Y-type zeolite, ZSM zeolites, MCM-41, MCM-48, and silicalite.

Depending on the types of impurities present in the helium-containing feed gas, one or a combination of the aforementioned adsorbents could be used in the TSA/VPSA beds of the present invention. In addition, structured adsorbents are expected to be suitable for use in some or all of the beds in FIGS. 3, 6 and 8. See e.g. U.S. patent application Ser. No. 11/644,287 to Baksh, filed Dec. 22, 2006 and entitled "Composite Structured Adsorbents" and published as U.S. Published Patent Application No. US2008-0148936 A1 on Jun. 26, 2008 as well as PCT International Patent Application No. PCT/US07/88598 entitled "Composite Structured Adsorbents", filed Dec. 21, 2007 and published on Jul. 3, 2008 as WO 2008/080080 A2; the entire contents of U.S. patent application Ser. No. 11/644,287 (and U.S. Published Patent Application No. US2008-0148936 A1) and PCT International Patent Application No. PCT/US07/88598 are incorporated herein by reference.

Although the aforementioned invention is disclosed with respect to the production of helium from low helium-containing feed gases, various changes or modifications could be made, by one ordinarily skilled in the art, without departing from the scope of the present invention. Additionally, more or less number of beds could be used in the process of FIGS. 3, 6 and 8. Moreover, each bed could include one or several layers of adsorbents, or mixtures of adsorbents. The adsorber configuration selected (e.g., radial, axial, structured, etc) and choice and arrangement of the adsorbents will be determined based on size of the feed flow, the type of feed source, and TSA/VPSA process operating conditions.

In addition, CaX, VSA-6, 5A, 13X, and mixed cations zeolites could be used as the adsorbents in the VPSA processes of FIGS. 6 and 8. Other adsorbents, including activated carbons with different bulk densities and other zeolitic materials such as Li—X zeolite, CaX (2.0), etc, could further be used in the VPSA separation process without deviating from the scope of the invention. For example, instead of using (or, in addition to using) VSA-6 zeolite, the VPSA process could also use CaX (2.0), naturally occurring crystalline zeolite molecular sieves such as chabazite, erionite and faujasite and combinations thereof. In addition, zeolite containing lithium/alkaline earth metal A and X zeolites (see U.S. Pat. Nos. 5,413,625 and 5,174,979 to Chao et al.; and U.S. Pat. Nos. 5,698,013; 5,454,857 and 4,859,217 to Chao) may also be suitable for use in the present invention.

Additionally, each of the layered adsorbent zones in each of the VPSA bed in FIGS. 6 and 8 could be replaced with layers of adsorbents. For example, the single layer of zeolite in each bed could be replaced with multiple layers of different adsorbents (e.g., VSA 6 could be replaced by a first layer of 13 X with VSA6 on top). In addition, the zeolite layer could be substituted by a composite adsorbent layer containing different adsorbent materials positioned in separate zones in which temperature conditions within a bed favor adsorption performance of the particular adsorbent material under applicable processing conditions in each zone. Further details on composite adsorbent layer design are disclosed for example in U.S. Pat. No. 5,674,311 by Notaro et al.

It will be appreciated by those skilled in the art that the time for a given cycle or phase in a given cycle can vary depending on several factors, such as the composition of the feed (including the concentrations of the impurities therein), process conditions such as flow rates and pressures and size of adsorbent beds. It will further be appreciated by those skilled in the art that cycle and phase times can be selected depending on the time it takes for an adsorbent bed to reach breakthrough conditions. In addition, appropriate valves can be selected based on the desired function(s). It should be appreciated that controlled scheme and apparatus for controlling the desired product purity and the various operating conditions associated with each system are incorporated in the recovery process via computer programming and interface.

Although the aforementioned invention is disclosed in relation to helium recovery from low helium (i.e., less than 10% helium by volume)-containing feed gases, the aforementioned key features could also be extended to other separation/purification processes, such as for example the recovery of hydrogen from refinery off gases. In such cases, the % of hydrogen in the feed gas may be in the range of 20-75% hydrogen by volume.

Although the invention has been described in detail with reference to certain preferred embodiments, those skilled in the art will recognize that there are other embodiments within the spirit and the scope of the claims.

What is claimed is:

1. A process for the recovery of helium, the process comprising:
    introducing a helium-containing feed gas into a temperature swing adsorption system;
    pretreating the helium-containing feed gas in the temperature swing adsorption system to produce a helium-containing pretreated feed gas;
    treating the helium-containing pretreated feed gas in a stage one pressure swing adsorption system to produce a stage one helium-containing purified gas and a stage one tail gas; and
    treating the helium-containing purified gas in a stage two pressure swing adsorption system to produce a helium-containing product stream and a stage two tail gas,
    wherein at least a portion of the stage one tail gas is introduced into the temperature swing adsorption system.

2. The helium recovery process of claim 1, wherein at least a portion of the stage two tail gas is introduced into the stage one pressure swing adsorption system.

3. The helium recovery process of claim 1, further comprising feeding at least a portion of the stage one tail gas into a first buffer tank and providing at least a portion of the stage one tail gas from the first buffer tank to the temperature swing adsorption system.

4. The helium recovery process of claim 1, further comprising feeding the helium-containing pretreated feed gas into a second buffer tank and providing the helium-containing pretreated feed gas from the second buffer tank to the stage one pressure swing adsorption system and further comprising feeding the helium-containing purified feed gas to a third buffer tank and providing the helium-containing purified feed gas from the third buffer tank to the stage two pressure swing adsorption system.

5. The helium recovery process of claim 1, wherein the stage one pressure swing adsorption system comprises a vacuum pressure swing adsorption (VPSA) system.

6. The helium recovery process of claim 5, wherein the stage one VPSA system includes four adsorption beds, each adsorption bed having at least one adsorbent contained therein.

7. The helium recovery process of claim 6, wherein each adsorbent bed in the stage one VPSA system includes at least a first adsorbent, a second adsorbent and a third adsorbent contained therein.

8. The helium recovery process of claim 7, wherein the first adsorbent in the stage one VPSA system comprises alumina contained proximate to a first end of each respective adsorbent bed, the second adsorbent in the stage one VPSA system comprises activated carbon positioned downstream of the alumina adsorbent in each respective bed and the third adsorbent in the stage one VPSA system comprises zeolite positioned downstream of the activated carbon adsorbent in each respective bed.

9. The helium recovery process of claim 6, wherein the helium-containing pretreated gas is processed in the stage one VPSA system to produce the helium-containing purified feed gas in a twelve-step cycle in which:

|  | Step | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Bed 1 (BD1) | AD1 | AD2/ PP1 | AD3/ PP2 | EQ1DN | PPG | EQ2DN | BD | PG | EQ1UP | EQ2UP | PP1 | PP2 |
| Bed 2 (BD2) | BD | PG | EQ1UP | EQ2UP | PP1 | PP2 | AD1 | AD2/ PP1 | AD3/ PP2 | EQ1DN | PPG | EQ2DN |
| Bed 3 (BD3) | EQ1DN | PPG | EQ2DN | BD | PG | EQ1UP | EQ2UP | PP1 | PP2 | AD1 | AD2/ PP1 | AD3/ PP2 |
| Bed 4 (BD4) | EQ2UP | PP1 | PP2 | AD1 | AD2/ PP1 | AD3/ PP2 | EQ1DN | PPG | EQ2DN | BD | PG | EQ1UP | wherein
AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or bottom-to-bottom bed equalization
BD = Blowdown
PG = Purge
EQ1UP = First Equalization Up or bottom-to-bottom bed equalization
EQ2UP = Second Equalization Up or top-to-top bed equalization
PP1 = First Product Pressurization
PP2 = Second Product Pressurization.

10. The helium recovery process of claim 1, wherein the stage two pressure swing adsorption system comprises a vacuum pressure swing adsorption (VPSA) system.

11. The helium recovery process of claim 10, wherein the stage two VPSA system includes four adsorption beds, each adsorption bed having at least one adsorbent contained therein.

12. The helium recovery process of claim 11, wherein each adsorbent bed in the stage two VPSA system includes at least a first adsorbent, a second adsorbent and a third adsorbent contained therein.

13. The helium recovery process of claim 12, wherein the first adsorbent in the stage two VPSA system comprises alumina contained proximate to a first end of each respective adsorbent bed, the second adsorbent in the stage two VPSA system comprises activated carbon positioned downstream of the alumina adsorbent in each respective bed and the third adsorbent in the stage two VPSA system comprises zeolite positioned downstream of the activated carbon adsorbent in each respective bed.

14. The helium recovery process of claim 11, wherein the helium-containing purified gas is processed in the stage two VPSA system to produce the helium-containing product feed gas in a twelve-step cycle in which:

|  | Step | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Bed 1 (BD1) | AD1 | AD2/ PP1 | AD3/ PP2 | EQ1DN | PPG | EQ2DN | BD | PG | EQ1UP | EQ2UP | PP1 | PP2 |
| Bed 2 (BD2) | BD | PG | EQ1UP | EQ2UP | PP1 | PP2 | AD1 | AD2/ PP1 | AD3/ PP2 | EQ1DN | PPG | EQ2DN |
| Bed 3 (BD3) | EQ1DN | PPG | EQ2DN | BD | PG | EQ1UP | EQ2UP | PP1 | PP2 | AD1 | AD2/ PP1 | AD3/ PP2 |
| Bed 4 (BD4) | EQ2UP | PP1 | PP2 | AD1 | AD2/ PP1 | AD3/ PP2 | EQ1DN | PPG | EQ2DN | BD | PG | EQ1UP | wherein
AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or top-to-bottom bed equalization
BD = Blowdown
PG = Purge
EQ1UP = First Equalization Up or top-to-bottom bed equalization
EQ2UP = Second Equalization Up or top-to-top bed equalization
PP1 = First Product Pressurization
PP2 = Second Product Pressurization.

15. The helium recovery process of claim 1, wherein the temperature swing adsorption system includes three adsorption beds, each adsorption bed having at least one adsorbent contained therein.

16. The helium recovery process of claim 15, wherein the at least one adsorbent selectively adsorbs at least one heavy contaminant in the helium-containing feed gas.

17. The helium recovery system of claim 16, wherein the at least one heavy contaminant in the helium-containing feed gas is selected from the group consisting of: $C_6^+$ heavy hydrocarbons, $H_2S$, $H_2O$ and mixtures thereof.

18. The helium recovery process of claim 15, wherein the helium-containing feed gas is processed in the temperature swing adsorption system to produce the helium-containing pretreated feed gas in a three-step cycle in which:

| Step | 1 | 2 | 3 |
| --- | --- | --- | --- |
| Bed No. 1 (PB1) | Online | Heating | Cooling |
| Bed No. 2 (PB2) | Cooling | Online | Heating |
| Bed No. 3 (PB3) | Heating | Cooling | Online | wherein Online is adsorption step, Heating is counter-current with respect to feed direction, and Cooling is co-current with respect to feed direction.

19. The helium recovery process of claim 15, wherein each adsorbent bed includes at least a first adsorbent and a second adsorbent contained therein.

20. The helium recovery process of claim 19, wherein the first adsorbent comprises alumina and the second adsorbent comprises at least one adsorbent selected from the group consisting of: silica gel, titanium silicates, aluminosilicates, ZSM5 supported on gamma alumina, alumina, activated carbon and treated activated carbon and clinoptilolite.

21. The helium recovery process of claim 20, wherein the first adsorbent comprises alumina and the second adsorbent comprises barium ion exchanged clinoptilolite.

22. A process for the recovery of helium, the process comprising:
treating a helium-containing feed gas in a stage one pressure swing adsorption system comprising four adsorption beds (Bed 1 (BD1), Bed 2 (BD2), Bed 3 (BD3), Bed 4 (BD4)) to produce a stage one helium-containing purified feed gas and a stage one tail gas; and
treating the helium-containing purified feed gas in a stage two pressure swing adsorption system comprising four adsorption beds (Bed 5 (BD5), Bed 6 (BD6), Bed 7 (BD7), Bed 8 (BD8)) to produce a helium-containing product stream and a stage two tail gas,
wherein the stage one pressure swing adsorption system to produce the helium-containing purified feed gas comprises a twelve-step cycle in which:

|  | Step | | | | | | | | | | | |
| --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 |
| Bed 1 (BD1) | AD1 | AD2/ PP1 | AD3/ PP2 | EQ1DN | PPG | EQ2DN | BD | PG | EQ1UP | EQ2UP | PP1 | PP2 |
| Bed 2 (BD2) | BD | PG | EQ1UP | EQ2UP | PP1 | PP2 | AD1 | AD2/ PP1 | AD3/ PP2 | EQ1DN | PPG | EQ2DN |
| Bed 3 (BD3) | EQ1DN | PPG | EQ2DN | BD | PG | EQ1UP | EQ2UP | PP1 | PP2 | AD1 | AD2/ PP1 | AD3/ PP2 |

-continued

|  | Step | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Bed 4 (BD4) | EQ2UP | PP1 | PP2 | AD1 | AD2/ PP1 | AD3/ PP2 | EQ1DN | PPG | EQ2DN | BD | PG | EQ1UP | wherein
AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or bottom-to-bottom bed equalization
BD = Blowdown
PG = Purge
EQ1UP = First Equalization Up or bottom-to-bottom bed equalization
EQ2UP = Second Equalization Up or top-to-top bed equalization
PP1 = First Product Pressurization
PP2 = Second Product Pressurization, and wherein the helium-containing purified gas is processed in the stage two pressure swing adsorption system to produce the helium-containing product feed gas comprises a twelve-step cycle in which:

|  | Step | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Bed 5 (BD5) | AD1 | AD2/ PP1 | AD3/ PP2 | EQ1DN | PPG | EQ2DN | BD | PG | EQ1UP | EQ2UP | PP1 | PP2 |
| Bed 6 (BD6) | BD | PG | EQ1UP | EQ2UP | PP1 | PP2 | AD1 | AD2/ PP1 | AD3/ PP2 | EQ1DN | PPG | EQ2DN |
| Bed 7 (BD7) | EQ1DN | PPG | EQ2DN | BD | PG | EQ1UP | EQ2UP | PP1 | PP2 | AD1 | AD2/ PP1 | AD3/ PP2 |
| Bed 8 (BD8) | EQ2UP | PP1 | PP2 | AD1 | AD2/ PP1 | AD3/ PP2 | EQ1DN | PPG | EQ2DN | BD | PG | EQ1UP | wherein
AD1 = First Adsorption Step
AD2/PP1 = Second Adsorption Step/First product pressurization
AD3/PP2 = Third Adsorption Step/Second product pressurization
EQ1DN = First Equalization Down or top-to-top bed equalization
PPG = Provide Purge Gas
EQ2DN = Second Equalization Down or top-to-bottom bed equalization
BD = Blowdown
PG = Purge
EQ1UP = First Equalization Up or top-to-bottom bed equalization
EQ2UP = Second Equalization Up or top-to-top bed equalization
PP1 = First Product Pressurization
PP2 = Second Product Pressurization.

\* \* \* \* \*

UNITED STATES PATENT AND TRADEMARK OFFICE
CERTIFICATE OF CORRECTION

PATENT NO. : 8,268,047 B2  
APPLICATION NO. : 12/769196  
DATED : September 18, 2012  
INVENTOR(S) : Mohamed Safdar Allie Baksh Page 1 of 1

It is certified that error appears in the above-identified patent and that said Letters Patent is hereby corrected as shown below:

On the title page item;

(75) Inventor: Mohamed Safdar Allie, Wheatfield, NY (US) should read as follows:

(75) Inventor: Mohamed Safdar Allie Baksh, Wheatfield, NY (US).

Signed and Sealed this  
Thirteenth Day of November, 2012

David J. Kappos  
*Director of the United States Patent and Trademark Office*